(12) United States Patent
Moon

(10) Patent No.: US 11,703,387 B2
(45) Date of Patent: Jul. 18, 2023

(54) TIME-RESOLVED SINGLE-PHOTON COUNTING APPARATUS

(71) Applicant: KOOKMIN UNIVERSITY INDUSTRY ACADEMY COOPERATION FOUNDATION, Seoul (KR)

(72) Inventor: Sucbei Moon, Seoul (KR)

(73) Assignee: KOOKMIN UNIVERSITY INDUSTRY ACADEMY COOPERATION FOUNDATION, Seoul (KR)

( * ) Notice: Subject to any disclaimer, the term of this patent is extended or adjusted under 35 U.S.C. 154(b) by 171 days.

(21) Appl. No.: 17/428,435

(22) PCT Filed: Jan. 20, 2020

(86) PCT No.: PCT/KR2020/000927
§ 371 (c)(1),
(2) Date: Aug. 4, 2021

(87) PCT Pub. No.: WO2020/162669
PCT Pub. Date: Aug. 13, 2020

(65) Prior Publication Data
US 2022/0113189 A1 Apr. 14, 2022

(30) Foreign Application Priority Data
Feb. 7, 2019 (KR) ........................ 10-2019-0014329

(51) Int. Cl.
*G01J 3/28* (2006.01)
*G01J 3/10* (2006.01)
*G01J 3/44* (2006.01)
(52) U.S. Cl.
CPC ............... *G01J 3/2889* (2013.01); *G01J 3/10* (2013.01); *G01J 3/4406* (2013.01)

(58) Field of Classification Search
CPC .... G01J 3/28; G01J 3/2889; G01J 3/10; G01J 3/4406; G01J 3/00; G01J 2001/442; G01J 1/44; H03M 1/1255
See application file for complete search history.

(56) References Cited

U.S. PATENT DOCUMENTS

| 2004/0007675 A1* | 1/2004 | Gillispie | ............... G01J 3/4406 250/458.1 |
| 2008/0164414 A1* | 7/2008 | Stellari | .............. G02B 21/0084 250/347 |
| 2014/0170760 A1* | 6/2014 | Tanabe | ............... G01N 21/6486 250/206 |

FOREIGN PATENT DOCUMENTS

| JP | H09184800 | 7/1997 |
| JP | 2005/091349 | 4/2005 |

(Continued)

OTHER PUBLICATIONS

International Search Report and Written Opinion issued in Corresponding PCT application No. PCT/KR2020/000927, dated Sep. 16, 2020 (English Translation provided).

*Primary Examiner* — Abdullahi Nur
(74) *Attorney, Agent, or Firm* — Norton Rose Fulbright US LLP

(57) ABSTRACT

The present invention provides a time-resolved single-photon counting apparatus, including an excitation light source for generating pulsed excitation light, a specimen optics for collecting an optical signal caused by irradiating the pulsed excitation light to a specimen, a photoelectric converter for photoelectrically converting the optical signal to generate an analog single-photon signal, an analog-to-digital (AD) signal converter for sampling the analog single-photon signal to convert the same into a digital single-photon signal, a digital photon-discrimination and timing detector for generating a photon-discrimination signal by discriminating the single- (Continued)

photon property of the digital single-photon signal to count a pulse time point of the digital single-photon signal to generate a delay time signal having delay time information, and a time-signal processor for counting valid single-photon detection events according to the delay time with reference to the photon-discrimination signal.

15 Claims, 9 Drawing Sheets

(56) References Cited

FOREIGN PATENT DOCUMENTS

| | | |
|---|---|---|
| JP | 2015/501415 | 1/2015 |
| KR | 20120098529 | 9/2012 |
| KR | 101835815 | 3/2018 |

* cited by examiner

TIME-RESOLVED SINGLE-PHOTON COUNTING APPARATUS

CROSS-REFERENCE TO RELATED APPLICATION

This application is a national phase application under 35 U.S.C. § 371 of International Application No. PCT/KR2020/000927, filed Jan. 20, 2020, which claims priority to and the benefit of Korean Patent Application No. 10-2019-0014329, filed on Feb. 7, 2019, the contents of which applications are incorporated herein by reference in their entirety.

BACKGROUND

1. Field of the Invention

The present invention relates to an optical measurement apparatus for sensitively measuring the intensity of an optical signal, and to a time-resolved single-photon counting apparatus or a time-correlated single-photon counter (TCSPC) that sequentially detects individual photons and counts the same according to the detection timing.

The time-resolved single-photon counting apparatus according to the present invention can measure the temporal intensity distribution of a low-intensity optical signal modulated at a high speed. In particular, it can be utilized in time-resolved spectroscopy as a means for analyzing the temporal luminescence characteristics of minute spectral signals.

2. Discussion of Related Art

Light can be described as a bundle of photons that are quantum mechanical particles. The electronic photodetector detects the intensity of light sensed by current or voltage by generating photoelectrons by which photons to be detected are converted to electrons of mobility.

A photodetector with very high sensitivity can detect individual photons, and in particular, if photoelectrons are multiplied with a high gain in the photoelectric conversion process, individual photons can be observed in the form of electric pulses in large amplitudes.

Among various types of photodetectors, the photomultiplier tube (PMT) and the avalanche photodiode (APD) have high signal gains which enable detection of individual photons, and these are widely utilized as photodetectors for single photon-level sensitivity.

An apparatus which counts the number of photons is referred to as a single-photon counter. It can obtain the intensity of light by digitally counting the number of single photon detection events under the measurement condition of single photons, where individual photons are separately detected as single photons and can be counted as pulses independent of each other, Such a single-photon counter can accurately and precisely quantify the intensity of light even when the intensity of light is very low. It is widely used in astronomy and spectroscopy devices.

An ordinary single-photon counter simply counts the total number of single photons detected during a given measurement time, in contrast, a time-resolved single-photon counter counts single photons for time-domain information composed of the photon detection times with reference to a certain reference time point. Accordingly, the time-resolved single-photon counter quantifies the temporal distribution of the event of single-photon detection to obtain the temporal distribution information of the intensity of minute optical signals.

The time-resolved single-photon counter can be utilized in the analysis of optical signals having low optical intensity and a temporally modulated temporal distribution probability. The time-resolved single-photon counter can be used for any applications. The most representative application field is the field of spectroscopy, which investigates the optical emission characteristics of a specimen. Hereinafter, the description of the time-resolved single-photon counter technology will be described by focusing on its application in the field of spectroscopy. However, it should be noted that the ideas presented by the present invention are not limited to the applications in the field of spectroscopy.

A spectrometer is a device used in the investigation of the characteristics of light and the characteristics of light emission sources. A spectrometer in the classical construction is a device that measures the distribution of light by wavelength or frequency. Among the advanced spectroscopy techniques derived from this, there is a time-resolved spectroscopy device that measures the temporal characteristics of photon emission. In the time-resolved spectroscopy technology, temporally amplitude-modulated excitation light is applied to a specimen to be irradiated, and the temporal modulation characteristics of the specimen's emission light produced by the specimen interacting with the excitation light are measured to find the optical properties the specimen.

This time-resolved spectroscopy technique can be subdivided into fluorescence, phosphorescence, scattered light and the like according to the emission properties of the specimen-emitted light. In the description of the present invention, time-resolved fluorescence spectroscopy, which temporally analyzes specimen-emitted light of fluorescence, will be mainly described. However, it should be noted that the ideas presented by the present invention are not limited thereto, Fluorescence is an optical light-emission phenomenon mainly caused by the interstate transitions of electrons in molecules. The electrons of the molecule absorb photons incident from the outside and are transitioned to a high-energy excited state, and then return to a low-energy state after a certain period of time. In this process, the transition energy is mostly consumed by emitting fluorescence photons. Herein, the energy of the fluorescence photons provides spectral information about the distribution of electronic states that cause fluorescence.

Meanwhile, the duration of time an electron stays in an excited state varies depending on internal and external factors of the molecule, providing useful spectroscopic information. The average value of the duration of the excited state is called the lifetime of that state, and it is called fluorescence lifetime involving fluorescence emission. That is, fluorescence lifetime means the retention time of an excited state capable of emitting fluorescence. In the transition of individual electronic states, the lifetimes thereof are random by quantum mechanical processes. Therefore, the fluorescence lifetime as an average value is obtained statistically by examining the collective electron transitions.

The probability of an electron undergoing fluorescence transition follows an exponential decay function in time if it is due to a simple transition mechanism. Therefore, if a group of electrons are excited and released in an excited state at a certain time point, the number of fluorescence photons per unit time emitted therefrom also follows an exponential decay function, having a peak at the beginning and then decreasing exponentially in time.

The fluorescence lifetime is defined as the statistical expectation value of the time at which each fluorescence photon is emitted from the time point of excitation, and it is equal to the characteristic time constant of the exponential decay function of fluorescence emission when it has a transition rate in the form of a simple exponential decay function. Herein, the time constant means the time it takes for the exponential decay function to decrease from 1 to 1/e.

Such time-resolved spectroscopy techniques for measuring the fluorescence lifetime can be classified according to the modulation method of the excitation light. When the intensity of the excitation light is amplitude-modulated to have a harmonic waveform, the emitted fluorescence is also amplitude-modulated to the harmonic waveform. In this case, the fluorescence lifetime may be determined by measuring changes in the modulation amplitude and modulation phase of fluorescence signals according to the modulation frequency. This time-resolved spectroscopy technique is suitable when a fluorescence signal is strong in intensity.

As another method of measuring the fluorescence lifetime, the fluorescence lifetime can be measured by applying short-pulse excitation light having a short pulse width and measuring a temporal characteristic of fluorescence emission therefrom. For this purpose, a short-pulse laser having a pulse width of several hundred picoseconds (ps) or less is widely used as a light source of excitation light.

In this way, when short-pulse excitation light is used, the emitted fluorescence appears as a temporal waveform of a unique exponential decay function, and if this waveform information can be accurately obtained, the fluorescence lifetime can be easily determined. This is equivalent to finding a type of impulse response for the process of fluorescence generation.

Meanwhile, the method of using short-pulse excitation light can measure the fluorescence lifetime with higher sensitivity and accuracy than the method of using the excitation light with harmonic waveform modulation. In the following description, the technique of time-resolved fluorescence spectroscopy using short-pulse excitation light will be described in more detail.

The range of the fluorescence lifetime measured in the application of time-resolved fluorescence spectroscopy may be very different depending on the phosphor, but in many cases, it is between several hundred picoseconds (ps) and several tens of nanoseconds (ns). In addition, the technical requirements of the fluorescence lifetime measuring apparatus vary depending on the level of the fluorescence lifetime to be measured.

That is, when the measured fluorescence lifetime is relatively long for tens of nanoseconds or more, the characteristics of the fluorescence lifetime can be well detected with a photodetector having a relatively narrow bandwidth. In this case, a simple method of acquiring and analyzing a photoelectrically converted fluorescence signal with a digitizer such as an oscilloscope is sufficient. On the other hand, when the fluorescence lifetime is relatively short for around 1 ns, there are several technical difficulties in directly detecting a fluorescence signal and analyzing the same with a device such as a digitizer. This is because, in order to directly observe such a fluorescence waveform, the bandwidth of the photodetector must be sufficiently wide for several GHz or more, and the signal sampling rate of the digitizer must also be very high for several GHz or more.

Meanwhile, in practical applications of the technique of time-resolved fluorescence spectroscopy, a fluorescence signal to be detected often has a low intensity. In this case, the time-resolved fluorescence spectrometer requires high-sensitivity photodetectors such as PMT or APD. However, the bandwidth of these photodetectors is often less than several GHz.

The photoelectric conversion performance of such a high-sensitivity photodetector in a time-resolved spectrometer is limited by its bandwidth. A single photon-sensitive photodetector such as a typical PMT has a temporal impulse response of an output of 1 ns or more. Therefore, in the photoelectric conversion of a fluorescence signal having a short fluorescence lifetime, the waveform information of the signal is distorted in the photoelectric conversion process of the photodetector. Such signal distortion is a linear process usually described as a low-pass transfer characteristic. In order to neglect this signal distortion, the measured fluorescence lifetime should be significantly longer than the width of the impulse response of the photodetector.

In addition, in order to temporally analyze a fluorescence signal having a short fluorescence lifetime through direct waveform acquisition, a waveform acquisition means such as a digitizer based on an analog-to-digital signal converter must have a wide bandwidth and a high signal sampling rate.

That is, in order to analyze short waveform information of about 1 ns, a high-speed digitizer having a signal sampling rate of at least several GHz is required, and such a digitizer is costly and has limited applicability.

Due to the limitations of the electronic engineering technology, there are many problems in completely obtaining the exponential decay function of a fluorescent signal by the short-pulse excitation light through the direct signal acquisition method of photoelectric conversion and digital acquisition of the fluorescent signal.

As a fluorescence lifetime measurement method by direct signal acquisition, there have been proposed prior techniques of obtaining waveform information directly acquired with a signal sampling rate that is not high enough or a bandwidth of a digitizer that is not wide enough, and processing the same to precisely measure the fluorescence lifetime.

Specifically, as a method for overcoming the low-pass signal transfer characteristic, it is possible to some extent to recover the original waveform from the acquired signal by signal processing techniques such as the deconvolution operation. However, this method has a problem in that the signal-to-noise ratio (SNR) of a waveform signal is deteriorated, and a photodetector having a sufficiently wide bandwidth is still required.

In addition, there is a method of measuring the information of a fluorescence lifetime from the average timing information of a signal obtained by assuming the shape of the temporal waveform of a fluorescence signal as an exponential decay function. However, this method has a disadvantage in that it is not possible to obtain information of a complicated fluorescence emission process.

As a representative conventional technique for solving the technical difficulties of the above-described method for obtaining the temporal waveform information of a fluorescence signal and measuring an accurate and precise fluorescence lifetime, time-correlated single-photon counting (TCSPC) is widely utilized. The TCSPC apparatus is a type of single-photon counters and counts the number of single-photon signal pulses detected by the high-sensitivity photodetector. In addition, the TCSPC apparatus is characterized in that the number of photon-signal pulses is counted according to the time point of fluorescence photon emission by detecting the timing of a single-photon response pulse, that is, the characteristic time point of a pulse.

The TCSPC apparatus is designed to overcome the wide impulse response of a high-sensitivity photodetector such as PMT to obtain an accurate temporal waveform. As a requirement for the correct operation of such a TCSPC apparatus, only a single-photon pulse should be detected for each measurement period. In this way, when individual single-photon responses appear as pulses that are isolated from each other, the characteristic temporal position of the pulses can be precisely measured. In addition, by repeating this measurement operation over several measurement cycles, information on temporal intensity distribution of many photons is obtained.

Herein, the characteristic time point of a single-photon response pulse means the temporal position of the pulse that specifies the relative generation time point of a single-photon response. Often, a rising edge or falling edge of a detected pulse is used as a characteristic time point which can be determined with a height of the pulse, that is, the peak of the pulse waveform of a single-photon response at a constant ratio with respect to the height.

In the situation of multi-photon detection when a plurality of photons are detected nearly simultaneously, the temporal resolution of a signal at the photodetector output is limited by the temporal width of a single-photon response. However, the precision thereof is irrelevant in measuring the time point of individual single-photon responses in the case of single-photon detection. Therefore, the TCSPC apparatus can accurately obtain the temporal distribution of several photons bypassing the limitation of the temporal resolution of the photodetector. This is because only individual single photons are detected one by one under the single-photon measurement condition. Accordingly, it is possible to obtain accurate and precise time-resolved spectral information even with an optical detector having a relatively narrow bandwidth.

FIG. 1 is a schematic block diagram of the conventional time-resolved single-photon counting apparatus.

As illustrated in FIG. 1, the conventional time-resolved single-photon counting apparatus can be configured with an excitation light source 10, a specimen optics 20, a photoelectronic converter 30, an edge detector 40, a time-signal converter 50, a time-signal processor 60 and a system clock 70.

The excitation light source 10 generates short-pulse excitation light having a short pulse width to irradiate to a specimen, and the specimen optics 20 irradiates short-pulse excitation light to a fluorescent specimen to be examined and collects optical signals to generated by the specimen. In addition, the photoelectric converter 30 converts the optical signals of the specimen into single-photon signals, which are pulsed electrical signals, by utilizing a high-amplification photodetector (e.g., PMT) which is sensitive enough to detect even a single-photon signal.

For successful operation, in order for a single-photon signal to be caused by an single detected photon, the detection frequency of photons must be sufficiently low. Therefore, in order to operate the time-resolved single-photon counting apparatus as intended, the operator adjusts the intensity of pulsed excitation light or the intensity of the collected optical signal such that the single-photon signal is caused by a single detected photon within each measurement period at a high probability. This is an inconvenient feature in operation of the time-resolved single-photon counting apparatus and limits the overall measurement speed.

The edge detector 40 detects a pulse edge in order to obtain the characteristic time point of a single-photon signal and generates an edge-time signal having a pulse width-modulated square waveform. The edge detector 40 utilizes an electric circuit commonly referred to as a constant-fraction discriminator (CFD) to find a voltage having a constant ratio to the peak voltage of a single-photon signal to determine the rising or falling edge of a pulse. Then, an edge time-point signal having an edge synchronized with this edge time point is generated.

The time-signal converter 50 generates a time-delay signal from the edge time-point information provided by the edge time-point signal. The time-signal converter 50 obtains information of a relative time delay for the edge time-point signal with respect to a certain reference time point synchronized with the generation of an excitation light pulse, and outputs a delay time signal in which the magnitude of the time delay is encoded with an analog voltage or digital data. For the time signal converter 50, a circuit such as a time-to-amplitude converter (TAC) may be utilized.

The time-signal processor 60 obtains information on the relative time point of a single-photon signal pulse, that is, the detection time point of a single photon from the delay time signal provided in the form of an analog voltage or digital data, and digitally counts the number of detected photons based thereon. For example, the detection time point of a single photon may be classified into several time intervals, and the number of photons detected for each interval may be counted. As such, the information on the number of photons expressed in the form of time histogram may be the final time-resolved spectral information.

Meanwhile, when the photon of an optical signal is not detected within a certain measurement period, the time-signal processor 60 does not perform counting.

Meanwhile, the system clock 70 generates a measurement clock signal for synchronous operation of the time-resolved single-photon counting apparatus, in this case, the measurement clock signal is provided to the excitation light source 10 such that the excitation light source 10 generates pulsed excitation light in synchronization with the measurement clock signal. Accordingly, the period of the measurement clock signal becomes the measurement period of a single-photon count. In addition, the measurement clock signal is provided to the time-signal converter 50 such that the time signal converter 50 can determine the delay time with reference to the timing information. That is, the delay time is measured as the relative time of the edge time point of a single-photon signal with respect to the generation of a pulsed excitation light pulse.

In the conventional time-resolved single-photon counting apparatus, the analog electric circuit technology is utilized in the edge detector 40 and the time-signal converter 50. Accordingly, there is a problem in that signal processing results are sensitive to circuit parameters, and it is difficult to obtain variability or adaptability of signal processing.

In addition, such a conventional time-resolved single-photon counting apparatus has a limited measurement speed based on single-photon requirements.

The conventional time-resolved single-photon counting apparatus can only detect and count 1 or 0 photon within the measurement period of a single-photon count due to the operational principle thereof, and when multiple photons are simultaneously or almost simultaneously detected in a measurement period, the edge detector 40 cannot accurately measure the edge time point due to signal interference between temporally adjacent single-photon responses.

In order to statistically determine the fluorescence lifetime, a large number of fluorescence photons of several thousand or more must be individually detected and counted. The photon emission process of the fluorescence emission source is random, and the only way to control the number of detected photons within the measurement period of the time-resolved single-photon counting apparatus is to keep the average photon detection rate below a certain level.

In general, to satisfy the requirements of single-photon detection with high probability, the average value of the number of photons detected within one measurement period should be less than 0.01. Photons detected under such a low intensity condition may be regarded as single-photon signals for 99% or more of the detected photons to be individually detected. For example, if the time-resolved single-photon counting apparatus performs single-photon counting by utilizing an excitation laser having a pulse repetition rate of 10 MHz in the excitation light source 10, the photon detection rate is 0.01 times that, which is 100,000 per second or less. If 10,000 photon signals had to be collected for the determination of a statistically significant fluorescence lifetime, the total measurement time of the fluorescence lifetime would exceed 0.1 sec.

As such, in the conventional time-resolved single-photon counting apparatus, the measurement time cannot be reduced below a certain level because a low photon detection rate must be maintained in order to satisfy the requirements for single-photon detection. The limitation of the measurement speed in the single-photon counting technique is a problem in the applications such as high-speed time-resolved spectroscopy devices and fluorescence lifetime imaging that require high-speed spectral information acquisition.

FIG. 2 is a graph exemplarily illustrating the temporal waveforms of single-photon signals in the conventional time-resolved single-photon counting apparatus.

As illustrated in FIG. 2, the single-photon signal which is output from the photoelectric converter 30 may typically have a bell-shaped waveform. In addition, as illustrated in (a) of FIG. 2, the peak voltage $V_p$ of a pulse is the peak voltage of a single-photon signal f(t) which appears as a voltage that varies with time (t). In addition, a rising edge or falling edge is determined by a certain reference voltage $V_t$ when the signal voltage coincides with the reference voltage, and such a pulse edge is illustrated as a square dot in FIG. 2, and the edge time is denoted by $t_r$ and $t_f$ of a rising edge and falling edge, respectively.

The edge detector 40 may detect the edge of a single-photon signal based on a reference voltage which is set in two ways.

First, the edge detector 40 may generate a counting signal based on the absolute reference voltage of a constant level by utilizing a circuit element such as a signal comparator. Herein, if the peak voltage of a single-photon signal is lower than a predetermined level of a reference voltage, the counting signal does not have an edge, and if it is higher, the counting signal has an edge. In addition, the time signal processor 60 may effectively count only pulses of a single-photon signal having a peak voltage exceeding a predetermined level in such a way that the counting operation is triggered by the edge of a counting signal.

Second, the edge detector 40 may automatically set a reference voltage $V_t$ to a voltage obtained by taking a constant ratio of a peak voltage $V_p$ such that the edge may be detected at a certain ratio. Herein, the value at a level of 0.5 is appropriate for the constant ratio, and accordingly, $V_t$ is set at a level of 0.5 $V_p$.

The operational principle of edge detection by the constant ratio can be achieved in various configurations, but as illustrated in (b) of FIG. 2, the original single-photon signal f(t) detected by the photoelectric converter 30 can be duplicated through an analog circuit in such a way that a duplicate signal f'(t) of a single-photon signal having a constant time delay and attenuated by a constant ratio is compared with the original single-photon signal f(t). In this case, the edge time point discriminated at a constant ratio is determined at the intersection time point of these two signals, and an edge time-point signal can be generated as a square waveform having a constant voltage by a circuit element such as a signal comparator.

Herein, for the correct operation of the edge detector 40, the duplicate signal f'(t) should maintain a relatively constant voltage and have low voltage fluctuation in the vicinity of this signal peak where it intersects with the single-photon signal f(t). Otherwise, the edge time point cannot be accurately determined.

The edge detector 40 and the conventional time-resolved single-photon counting apparatus including the same according to this operating principle are techniques based on the analog circuit technology and have some consequent limitations. That is, as described above, the edge detector 40 need to be finely adjusted and determined such that the above-described correct operational conditions are satisfied in terms of signal attenuation and signal delay. However, a certain level of error may exist in actual implementation, and accordingly, the operation of the edge detector 40 appears different from the ideal. This appears as an aspect in which an edge time is determined with deterministic errors according to the random amplitude variation of a single-photon signal. In addition, when the pulse characteristics of a single-photon signal change due to replacement of the photoelectric converter 30, the characteristics of the edge detector 40 must be readjusted accordingly. But such an readjustment is not often easy in the analog circuit technology.

In addition, in the conventional time-resolved single-photon counting apparatus, the characteristics of an edge time-point signal and a delay time signal may be deteriorated even by phenomena such as signal distortion, noise addition and the like occurring during the generation and processing of the edge time-point signals and the delay time signals. Moreover, since the pulse waveforms of the single-photon signal and the edge time-point signal cannot be simply observed during the operation of the conventional time-resolved single-photon counting apparatus, it is impossible to simply respond or compensate for such deterioration.

In addition, as described above, in the conventional time-resolved single-photon counting apparatus, the operator must adjust the intensity of the optical signal and confirm that each measurement period has a single detected photon.

In addition, in the prior art, a large number of spectral signal photons cannot be detected within a short time, and thus, the overall measurement time is lengthened.

As such, the core idea of the present invention is to solve these problems of the conventional time-resolved single-photon counting technique by applying digital technology.

In the prior art, the edge detector 40 processes a single-photon signal using the analog circuit technology. If an analog single-photon signal is acquired to be of digital data through analog-to-digital (AD) signal conversion and a vulnerable process such as the determination of edge time points is performed by digital signal processing, the technical difficulties of the analog circuit technology can be solved.

SUMMARY OF THE INVENTION

As described above, the conventional time-resolved single-photon counting apparatus has the aforementioned problems due to the limitation of the analog electric circuit technology. Accordingly, information on time-resolved single-photon counts obtained by the conventional time-resolved single-photon counting apparatus has limitations in terms of reliability, precision and measurement speed.

As such, the present invention has been proposed to solve the problems of the prior art, and an object of the present invention is to provide a new time-resolved single-photon counting apparatus capable of overcoming the limitations of the conventional time-resolved single-photon counting apparatus. In addition, another object of the present invention is to provide a time-resolved single-photon counting apparatus having improved performance in terms of high speed, reliability and precision.

In order to solve the aforementioned problems, provided is a time-resolved single-photon counting apparatus, including an excitation light source for generating pulsed excitation light, a specimen optics for collecting an optical signal produced by irradiating the pulsed excitation light to a specimen, a photoelectric converter for photoelectrically converting the optical signal to generate an analog single-photon signal, an analog-to-digital (AD) signal converter for sampling the analog single-photon signal to convert the same into a digital single-photon signal, a digital photon-discrimination and timing detector for generating a photon-discrimination signal by discriminating the single-photon property of the digital single-photon signal and generating a delay time signal having delay time information by measuring a pulse time point of the digital single-photon signal, and a time-signal processor for counting valid single-photon detection events according to the delay time with reference to the photon-discrimination signal.

In addition, it further includes a system clock for generating and dividing a measurement clock signal having synchronization timing information for the pulse generation of the pulsed excitation light, and a sample clock signal having synchronization timing information of a signal sampling operation of the analog-to digital signal converter, wherein the measurement clock signal and the sample clock signal are both periodic timing signals having a periodic ratio of a constant integer, and temporal correlation with each other.

In addition, the delay time is measured as a relative time of the pulse time point with respect to the synchronization time point provided by the measurement clock signal.

In addition, the measurement clock signal is generated by photoelectric conversion of the pulsed excitation light generated by the excitation light source, and the system clock generates a sample clock signal having a periodic ratio of a constant integer with the measurement clock signal.

In addition, the digital photon-discrimination and timing detector extracts the characteristics of a temporal voltage waveform including at least one of a pulse size, a pulse width and a pulse shape provided by the digital single-photon signal, generates a photon-discrimination signal obtained by discriminating the single-photon property for the digital single-photon signal based on the characteristics of a temporal voltage waveform provided by the digital single-photon signal, and has two states of true and false, or single-photon and non-single-photon, or three states of multi-photon detection, single-photon detection and no-photon detection, and the time-signal processor performs a counting operation by considering the photon-discrimination information as a valid single-photon detection event if the single-photon property is in the state of true or single-photon detection.

In addition, the digital photon-discrimination and timing detector extracts a pulse peak of the digital single-photon signal, discriminates the single-photon property as the state of true or single-photon detection if the pulse peak is within the range of a preset effective upper limit voltage and effective lower limit voltage, discriminates the single-photon property as the state of false or no-photon detection when the pulse peak is less than the effective lower limit voltage, and discriminates the single-photon property as the state of false or multi-photon detection if the pulse peak is more than the effective upper limit voltage.

In addition, the digital photon-discrimination and timing detector extracts a pulse edge of the digital single-photon signal determined based on at least one preset reference voltage, from the temporal voltage waveform obtained in a predetermined time period of the digital single-photon signal, measures a pulse width at the time interval between the temporally earliest pulse edge and the temporally latest pulse edge, discriminates the single-photon property as the state of true or single-photon detection if the pulse width is less than or equal to a preset effective upper limit pulse width, and discriminates the single-photon property as the state of false or multi-photon detection if the pulse width is more than the effective upper limit pulse width.

In addition, the digital photon-discrimination and timing detector extracts the characteristics of a temporal voltage waveform including at least one of a pulse size, a pulse edge and a pulse shape provided by the digital single-photon signal, and counts a pulse time point as a relative time point at which the optical signal is detected by the photoelectric converter from the characteristics of the temporal voltage waveform.

In addition, the digital photon-discrimination and timing detector extracts a pulse peak of the digital single-photon signal, and finds a rising or falling pulse edge of the digital single-photon signal based on a constant-rate voltage value obtained by multiplying the voltage of the pulse peak by a preset constant rate to extract the time point of the rising or falling pulse edge to take as the pulse time point.

In addition, the digital photon-discrimination and timing detector extracts a voltage of the pulse peak or edge time point by interpolating or curve fitting the data of the digital single-photon signal temporally adjacent to the pulse peak or pulse edge.

In addition, the digital photon-discrimination and timing detector calculates a time average value or a central time point of a pulse obtained from a time sum using the voltage waveform of the digital single-photon signal as a weight value, and takes the central time point as the pulse time point.

In addition, the digital photon-discrimination and timing detector obtains a rearranged digital single-photon signal as a function of the time at which the digital single-photon signal is reset with the pulse time point as the origin point, sets upper and lower limits of a limit mask as a function of the reset time to compare the rearranged digital single-photon signal with the upper and lower limits of the limit mask, discriminates the single-photon property as the state of true or single-photon detection if the magnitude of the digital single-photon signal is within the range of the limit mask at a reference number or more of data points, discriminates the single-photon property as the state of false or no-photon detection if the magnitude of the digital single-photon signal is less than the lower limit of the limit mask at a reference number or more of data points, and discriminates the single-photon property as the state of false or multi-photon detection if the magnitude of the digital single-photon signal is more than the upper limit of the limit mask at a reference number or more of data points.

In addition, it further includes a pulse-shape converter for converting the single-photon signal which is output from the photoelectric converter into a preset temporal pulse shape to output to the analog-to-digital signal converter, wherein the signal voltage of the shape-converted single-photon signal has a central region of a pulse passing across the voltage value of a DC component thereof, and has a temporal pulse shape in which the signal voltage linearly increases or decreases at a constant voltage change rate in the central region.

In addition, the pulse-shape converter consists of a signal divider for dividing the single-photon signal into two, a signal delayer for delaying any one of the divided signals, and a signal combiner for combining these two signals and any one of the signal divider and the signal combiner is configured to invert a signal polarity for one of the divided or combined signals by altering the signal phase by 180 degrees.

In addition, the digital photon-discrimination and timing detector measures a DC component voltage from the digital single-photon signal derived from the shape-converted single-photon signal, finds a central edge that is a pulse edge determined based on the DC component voltage in the central region of the digital single-photon signal, and takes the central edge time point as the pulse time point.

In addition, the excitation light source or the specimen optics has an adjusting means capable of adjusting the optical intensity of the pulsed excitation light or the optical signal, wherein the time-signal processor measures a single-photon rate as the frequency of a photon-discrimination signal that appears in the state of single-photon detection for a predetermined period of time, or measures a no-photon or multi-photon rate as the frequency of a photon-discrimination signal that appears in the state of no-photon detection or multi-photon detection for a predetermined period of time, and wherein the adjusting means adjusts the optical intensity of the optical signal such that the single-photon rate, no-photon rate or multi-photon rate is within a preset range.

Unlike the conventional time-resolved single-photon counting apparatus, the time-resolved single-photon counting apparatus according to the present invention performs the measurement of the pulse time points and delay time of single-photon signals in the digital signal domain, and thus, it is possible to avoid the problems of the deterioration of measurement reliability and precision due to minute signal distortion that the technology relying on analog circuitry has. In addition, the flexibility and adaptability of signal processing can be easily obtained by processing single-photon signals in the digital signal domain.

In addition, the time-resolved single-photon counting apparatus according to the present invention discriminates the single-photon property in the digital signal domain and thereby performs single-photon counting, and even in the situation of frequent multi-photon detection where two or more photons are detected with high frequency in each measurement period, it is possible to filter out error-probable pulse time points and delay time information and obtain accurate time-resolved single-photon count information.

Accordingly, even when the expected value of the number of spectral signal photons detected in each measurement period greatly exceeds 0.01, unlike the conventional technique, single-photon counting can be smoothly performed. Therefore, a larger number of optical signal photons can be detected and counted during the limited overall measurement time.

DETAILED DESCRIPTION OF EXEMPLE EMBODIMENTS

Figure 1:
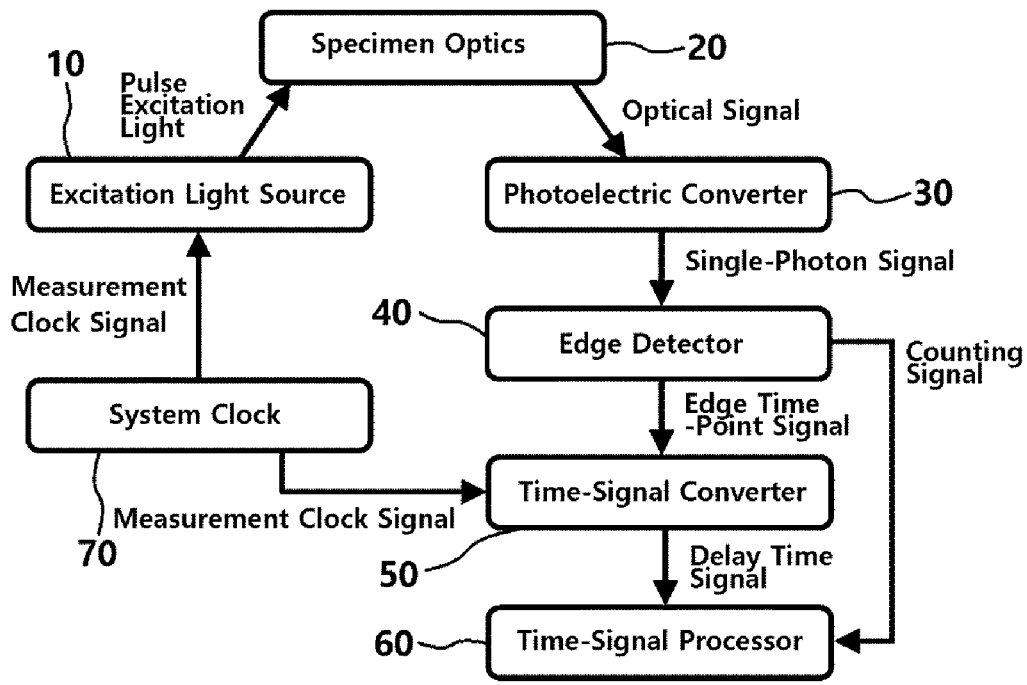
FIG. 1 is a schematic block diagram of the conventional time-resolved single-photon counting apparatus.
Figure 2:
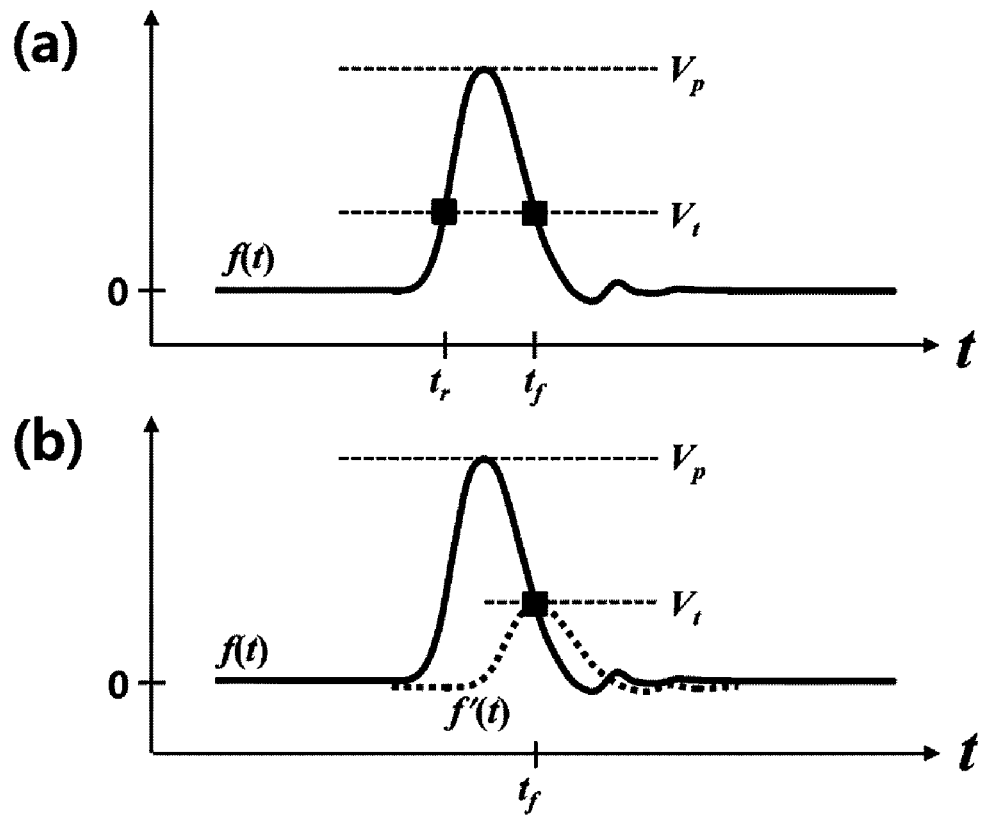
FIG. 2 is a graph exemplarily illustrating the temporal waveforms of single-photon signals in the conventional time-resolved single-photon counting apparatus.

Hereinafter, the exemplary embodiments of the present invention will be described in more detail with reference to the accompanying drawings. In this case, it should be noted that in the accompanying drawings, the same components are denoted by the same reference numerals as much as possible. In addition, detailed descriptions of well-known functions and configurations that may obscure the gist of the present invention will be omitted.

Figure 3:
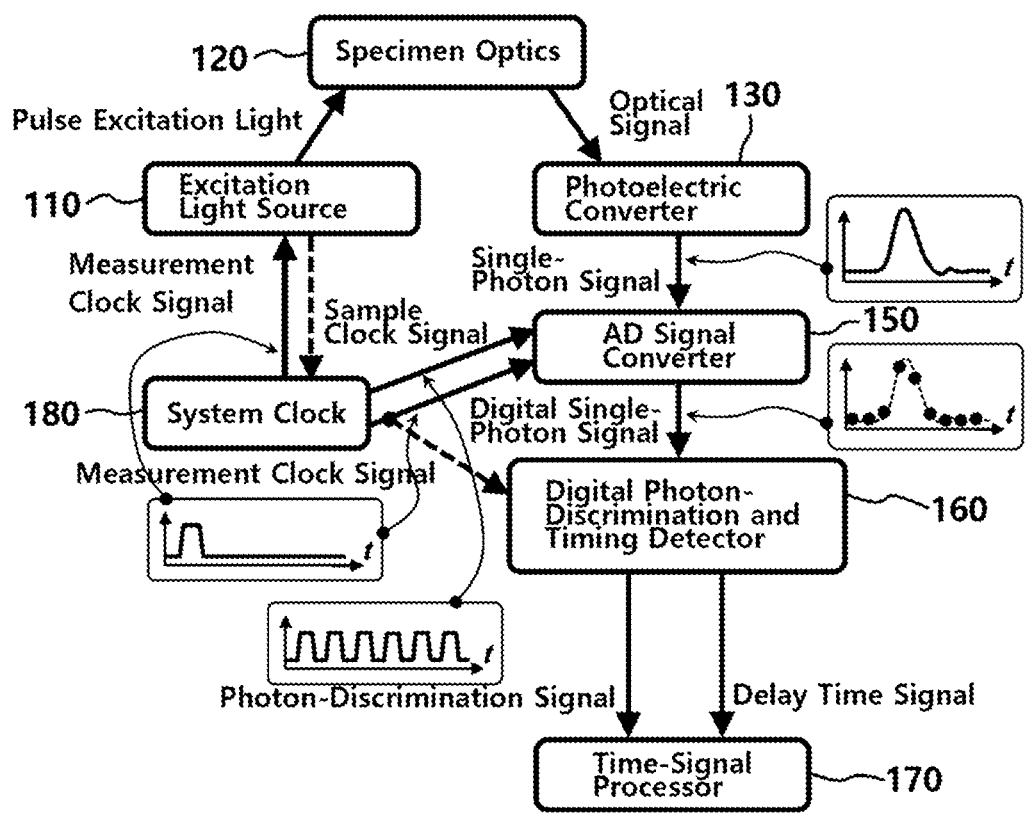
FIG. 3 is a schematic block diagram of the time-resolved single-photon counting apparatus according to an exemplary embodiment of the present invention.

FIG. 3 is a schematic block diagram of the time-resolved single-photon counting apparatus according to an exemplary embodiment of the present invention.

The time-resolved single-photon counting apparatus according to an exemplary embodiment of the present invention is basically an apparatus for obtaining single-photon counting information based on the above-described time-correlated single-photon counting method.

As illustrated in FIG. 3, the time-resolved single-photon counting apparatus according to an exemplary embodiment of the present invention may be configured by including an excitation light source 110, a specimen optics 120, a photoelectronic converter 130, an analog-to-digital (AD) signal converter 150, a digital photon-discrimination and timing detector 160 and a time-signal processor 170.

The excitation light source 110 generates pulsed excitation light and transmits the same to the specimen optics 120, and the specimen optics 120 irradiates the pulsed excitation light received from the excitation light source 110 to a specimen to collect the generated optical signal and transmits the same to the photoelectric converter 130.

The photoelectric converter 130 photoelectrically converts an optical signal through a high-gain photodetector such as PMT to generate an analog single-photon signal in the form of electric pulses. Such a photoelectric converter 130 may include an electrical signal amplifier, a low-pass filter and the like, in addition to the above-described photodetector.

The AD signal converter 150 converts an analog single-photon signal into a temporally discrete digital single-photon signal through signal sampling and amplitude quantization. Such a process is the same as a general analog-to-digital signal conversion, and it may be implemented as a circuit element such as the IC of high-speed ADC.

The digital photon-discrimination and timing detector 160 discriminates the single-photon property of the digital single-photon signal to generate a photon-discrimination signal, and also measures the pulse time point of the digital single-photon signal to generate a time-delay signal having relative delay time information therefrom.

The photon-discrimination signal and the time-delay signal generated in this way are input to the time signal processor 170 and finally construct time-resolved single-photon counting information.

The time signal processor 170 counts valid single-photon detection events according to the delay time with reference to the photon-discrimination signal.

Meanwhile, the time-resolved single-photon counting apparatus according to an exemplary embodiment of the present invention may further include a system clock (clock signal generator/distributer) 180 for synchronous operation.

The system clock 180 generates and distributes a measurement clock signal having synchronization timing information for the pulse generation of pulsed excitation light generated by the excitation light source 110 and a sample clock signal having synchronization timing information of the signal sampling operation of the AD signal converter 150.

Herein, the measurement clock signal is generated by the system clock 180 and provided to the excitation light source 110 such that the pulse excitation light is synchronized with the measurement clock signal or is generated by the excitation light source 110 and provided to the system clock.

In addition, the measurement clock signal and the sample clock signal are periodic timing signals. Their periods are a constant integer for the periodic ratio, and the two signals are temporally correlated with each other.

Herein, the periodic ratio is a value obtained by dividing the frequency or period of a sample clock signal by the frequency or period of a measurement clock signal, and it is an integer sufficiently larger than 1. That is, the frequency of the sample clock signal is significantly higher than the frequency of the measurement clock signal by an integer multiple.

In order to have an integer periodic ratio as described above, the measurement clock signal may be generated by digitally dividing the frequency of the sample clock signal having a relatively higher frequency, or may be generated by a circuit element such as a phase-locked loop (PLL) in such a way that the measurement clock signal and the sample clock signal maintain a constant correlation.

The AD signal converter 150 performs signal sampling operation in synchronization with the sample clock signal. The digital photon-discrimination and timing detector 160 or the AD signal converter 150 process the incoming signal with reference to the measurement clock signal.

When the measurement clock signal is provided to the AD signal converter 150 and configured to be referenced, the AD signal converter 150 performs signal sampling of an analog single-photon signal to generate and process data of a digital single-photon signal. In this case, the data of the digital single-photon signal may be generated and processed as a series of data packed for each measurement period in accordance with the timing of the measurement period provided by the measurement clock signal.

On the other hand, when the measurement clock signal is provided to the digital photon-discrimination and timing detector 160 and configured to be referenced, the delay time of a pulse time point is measured by the digital photon-discrimination and timing detector 160, with the relative time of the pulse time point with respect to the timing of the measurement period provided by the measurement clock signal.

The photon-discrimination signal generated by the digital photon-discrimination and timing detector 160 includes information on the single-photon property, that is, whether the digital single-photon signal is derived from the optical signal of a single photon in one measurement period. This may simply be a form of explicit true and false for a single-photon property, or it may be a characteristic indicator that implies the single-photon property. In any case, the time signal processor 170 refers to the photon-discrimination signal to perform single-photon counting.

The digital photon-discrimination and timing detector 160 and the time signal processor 170 may be implemented in the form of digital circuits, digital processors, or software programs for digital signal processing. Also, the delay time signal and the photon-discrimination signal may appear in various forms, while they contain digital information having the above-described properties.

The photon-discrimination signal generated by the digital photon-discrimination and timing detector 160 may be implicit in the form of the presence or absence of a certain signal and data. For instance, the delay time signal may be generated only if the single-photon property is true.

Figure 4:
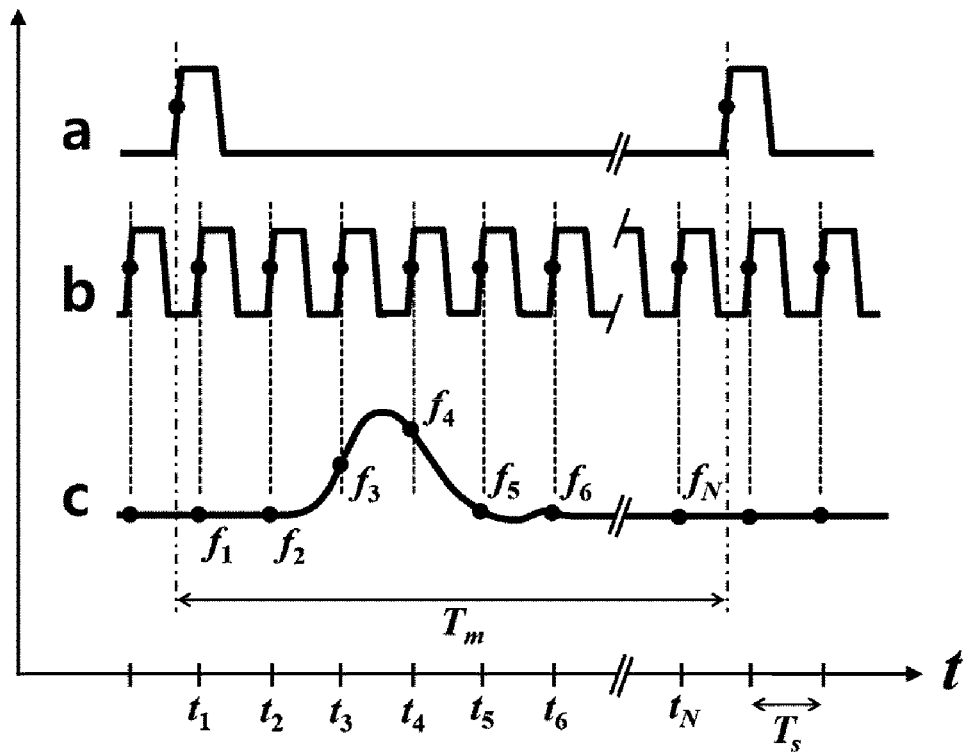
FIG. 4 is a graph exemplarily illustrating the temporal waveforms of a measurement clock signal, a sample clock signal and a single-photon signal in the time-resolved single-photon counting apparatus according to an exemplary embodiment of the present invention.

FIG. 4 is a graph exemplarily illustrating the temporal waveforms of a measurement clock signal, a sample clock signal and a single-photon signal in the time-resolved single-photon counting apparatus according to an exemplary embodiment of the present invention.

In the signal waveforms illustrated in FIG. 4, a denotes a measurement clock signal, b denotes a sample clock signal, and c denotes a single-photon signal.

Herein, the measurement clock signal determines the pulse period of the pulsed excitation light and the measurement period $T_m$ of the single-photon counting operation.

The starting point and the ending point of one measurement period may be determined by the edge of the measurement clock signal illustrated by dots in FIG. 4. The period of the signal sampling operation of the AD signal converter 150 is determined by the sample clock signal.

In FIG. 4, a positive integer index i is assigned to the edges of the sample clock signal. The edge times of $t_i$ are illustrated as $t_1, t_2, \ldots,$ and $t_N$, respectively. In addition, the signal sampling period $T_s$ becomes the time between adjacent edges, that is, $[t_{i+1}-t_i]$.

The AD signal converter 150 is synchronized with the edges of the sample clock signal and performs signal sampling for an analog single-photon signal f(t) as discrete data to obtain signal information such as $f_1, f_2, \ldots,$ and $f_N$.

Figure 5:
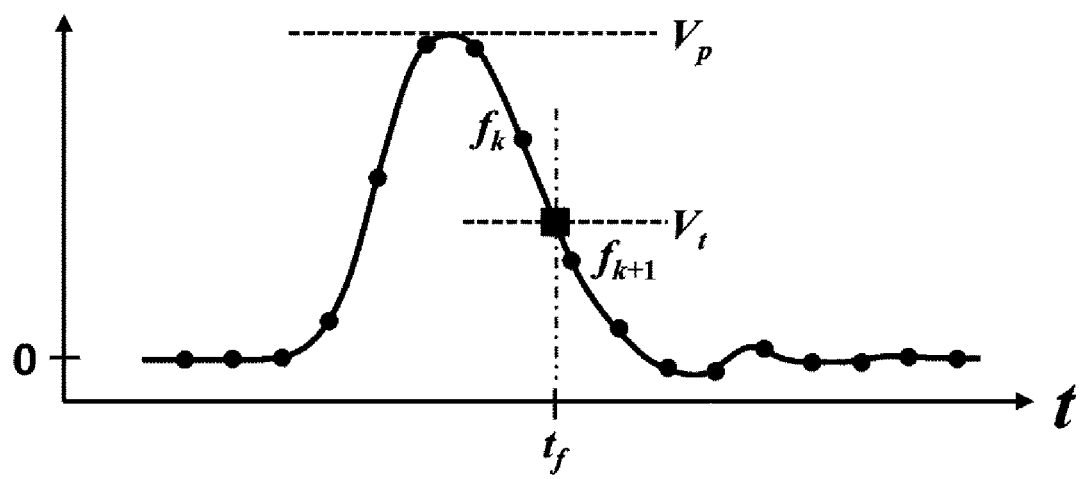
FIG. 5 is a graph exemplarily illustrating the temporal waveform and pulse time points of a single-photon signal in the time-resolved single-photon counting apparatus according to an exemplary embodiment of the present invention.

FIG. 5 is a graph exemplarily illustrating the temporal waveform and pulse time points of a single-photon signal in the time-resolved single-photon counting apparatus according to an exemplary embodiment of the present invention.

As described above, the analog single-photon signal is converted into a digital single-photon signal by the AD signal converter 150. Herein, the digital single-photon signal carries information of $f_i$ for each measurement period. The pulse time point is a temporal position of the single-photon signal and may be defined by an edge time point or other characteristic time point.

A process by which the digital photon-discrimination and timing detector 160 obtains the edge time point of a single-photon signal pulse from $f_i$ is as follows.

First, the peak voltage $V_p$ of f(t) is obtained from a series of $f_i$. $V_p$ can be obtained by simply finding the extremum of $f_i$, that is, the maximum value or the minimum value. Alternatively, for more precise peak determination, signal interpolation can be performed with a series of $f_i$ near the extremum, and the peak voltage $V_p$ may be obtained with higher precision by finding the extremum in the interpolated signal. For example, methods such as the cubic interpolation can be used.

Alternatively, the peak voltage $V_p$ may be obtained in high precision by curve fitting the series of $f_i$ near the extremum. A method of polynomial curve fitting can be used for this purpose. Or a look-up table (LUT) can be used for finding the peak voltage $V_p$, which is obtained in advance through methods such as signal interpolation, curve fitting or the like. In any way, the most likely voltage can be determined from the series of $f_i$ near the extremum to find the peak voltage $V_p$.

Finding the edge, the reference voltage $V_t$ may be determined by multiplying $V_p$ by a predetermined ratio. Then, the time at which the digital single-photon signal $f_i$ passes through the reference voltage $V_t$ is found and determined as the edge time point. If the falling edge is the case, a time point $t_i$ can be found where the signal of $f_i$ is higher than $V_t$ and the signal of $f_{i+1}$ is lower than $V_t$ for the edge time point. The very index i will be denoted by k. A more precisely determined edge time point is located between $t_k$ and $t_{k+1}$. Assuming that f(t) falls linearly between these two points, the edge point $t_f$ is found by a simple first-order equation of $t_k$ and $t_{k+1}$. In order to obtain higher precision, as described above, a precise edge time point may be determined by using signal interpolation, curve fitting or LUT from the series of $f_i$ around $t_k$ and $t_{k+1}$.

Meanwhile, the pulse time point may be determined by methods other than finding the edge time, such as finding the central time point of a pulse. In this case, the central time point of a pulse is the average time of the pulse obtained by weighting the intensity of a pulse signal for each time. It may be obtained from the time sum of $\Sigma[f_i \times t_i]/\Sigma[f_i]$ for the effective time interval of the pulse signal.

After the pulse time point is determined by any of those methods, the relative delay time of a single-photon signal pulse may be measured therefrom. Herein, the delay time is a relative pulse time point with respect to the timing of the measurement clock signal. It can be simply a time difference of the pulse time point to the edge time of the measurement clock signal.

If the AD signal converter 150 acquires a single-photon signal to construct a series of $f_i$ separately for each measurement period by using the timing of the measurement clock signal, and the time $t_1$ of the series is set as a relative time within the measurement period, the pulse time point and the delay time may be regarded as the same.

On the other hand, if the AD signal converter 150 obtains a digital single-photon signal without reference to the measurement clock signal, the digital photon-discrimination and timing detector 160 may obtain timing information from the signal edge of the measurement clock signal. In this case, the delay time may be measured as a relative value of the pulse time point with respect to the signal edge time point of the measured clock signal.

As described above, the time-resolved single-photon counting apparatus according to an exemplary embodiment of the present invention determines the pulse time point of a single-photon signal by digital signal processing. Therefore, once converted into a digital signal by the AD signal converter 150, there is no further chance of signal distortion and noise addition. In addition, measuring the pulse time point of a single-photon signal can be no more vulnerable to the amplitude variation of the pulse waveform or the fluctuation of the pulse width.

In the time-resolved single-photon counting apparatus according to an exemplary embodiment of the present invention, the digital photon-discrimination and timing detector 160 determines the single-photon property of a single-photon signal together with the pulse time point.

Specifically, the digital photon-discrimination and timing detector 160 extracts the characteristics of a temporal voltage waveform including at least one of the pulse size, pulse width and the pulse shape provided by the digital single-photon signal. Based on the characteristics of the temporal voltage waveform, a photon-discrimination signal having photon-discrimination information may be generated by discriminating the single-photon property of a single-photon signal.

Herein, the photon-discrimination information of the single-photon property may have two states of true and false, or single photon and non-single photon, or three states of multi-photon detection, single-photon detection and no-photon detection.

When the photon-discrimination information is in the state of true or single-photon detection, the time-signal processor 170 considers it as a valid single-photon detection event and performs a counting operation with reference to the corresponding delay time carried by the delay time signal.

Hereinafter, a method by which the digital photon-discrimination and timing detector 160 discriminates the single-photon property to generate a photon-discrimination signal will be described.

Figure 6:
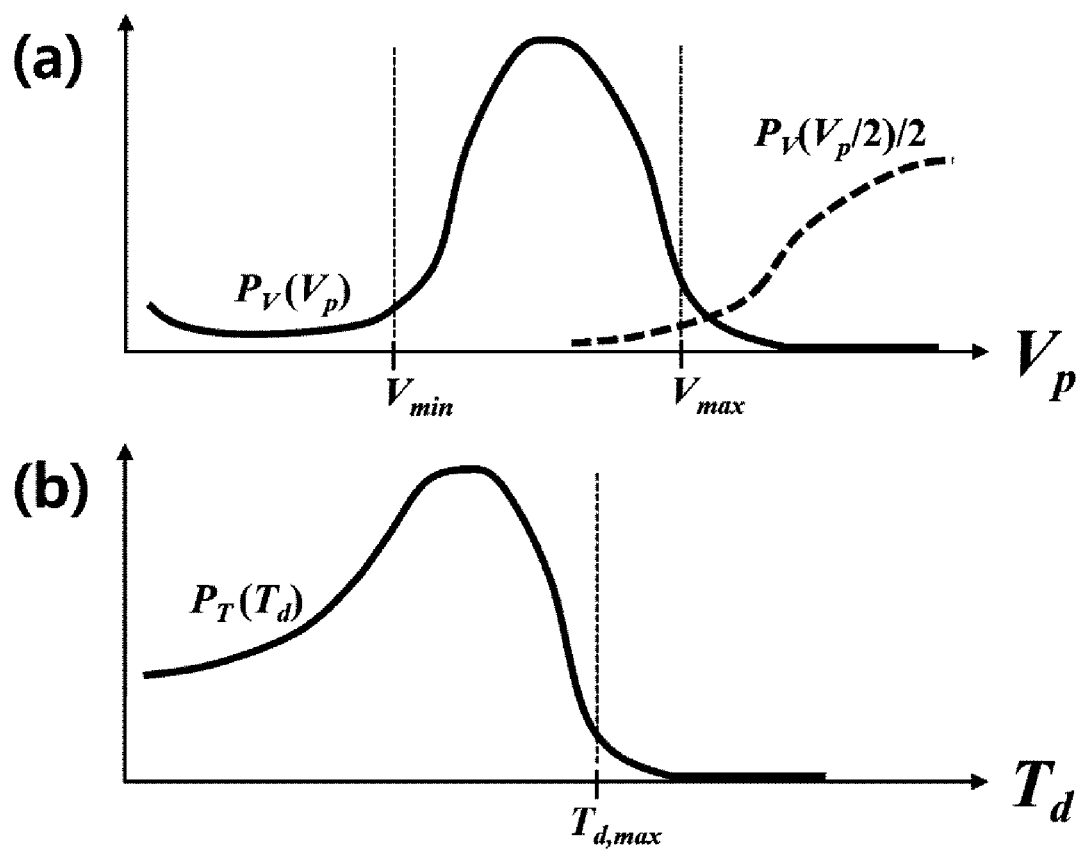
FIG. 6 is a graph exemplarily illustrating the probability distribution of a peak voltage $V_p$ of a single-photon signal and the probability distribution of a reference voltage pulse width $T_d$ in the time-resolved single-photon counting apparatus according to an exemplary embodiment of the present invention.

FIG. 6 is a graph exemplarily illustrating the probability distribution of a peak voltage $V_p$ of a single-photon signal and the probability distribution of a reference voltage pulse width $T_d$ in the time-resolved single-photon counting apparatus according to an exemplary embodiment of the present invention.

The pulse characteristics of a single-photon signal is mainly determined by the characteristics of the high-gain photodetector of the photoelectric converter 130. In particular, the high-gain photodetector such as a PMT has a characteristic in which the probability distribution of the gain spreads in the photoelectron multiplication process.

Accordingly, even when the single-photon signal is produced by low-intensity optical signal of single photons, the peak voltage $V_p$ appears randomly.

In most cases, the probability distribution of the peak voltage $V_p$ for the single-photon optical signal appears in the form of a bell shape having a single peak as shown in the graph (a) of FIG. 6. In addition, the effective width of the probability distribution varies depending on the characteristics of a photodetector.

The probability distribution of this peak voltage $V_p$ in the single-photon response of the photoelectric converter 130 may be obtained by statistically analyzing a single-photon signal obtained by inputting low-intensity light with a guaranteed high probability of the single-photon property to the photoelectric converter 130. In the graph (a) of FIG. 6, the probability distribution of the peak voltage in which the single-photon signal of a single-photon response obtained by this method is illustrated by $P_V(V_p)$.

Meanwhile, if two photons are simultaneously detected by the same photoelectric converter 130, the probability distribution of the peak voltage spreads further by a factor of two and may be approximated by $P_V(V_p/2)/2$. In the graph (a) of FIG. 6, the probability distribution of $P_V(V_p/2)/2$ is indicated by a dashed line. The photoelectric converter 130 in a preferred configuration should have a distribution curve in which two probability distributions, $P_V(V_p)$ and $P_V(V_p/2)/2$, are well distinguished with a minimal overlap. It should be noted that, in most cases, since the two probability distributions appear partially overlapping, it is not always possible to completely discriminate the single-photon property by the peak voltage of a single-photon signal.

The digital photon-discrimination and timing detector 160 of the present invention may determine the single-photon property of a pulse of the single-photon signal with a high success rate from the peak voltage $V_p$.

Specifically, the digital photon-discrimination and timing detector 160 extracts the pulse peak of a digital single-photon signal, and if the pulse peak is within a preset range of an effective upper limit voltage and an effective lower limit voltage, the single-photon property may be determined as the state of true or single-photon detection. In addition, if the pulse peak is less than the effective lower limit voltage, the single-photon property may be determined as the state of false or no-photon detection. In addition, if the pulse peak is more than the effective upper limit voltage, the single-photon property may be determined as the state of false or multi-photon detection.

For example, referring to FIG. 6, an effective upper limit voltage $V_{max}$ and an effective lower limit voltage $V_{min}$ may be set which define the central part of a bell shape in the probability distribution of $V_p$. In this case, the peak voltage $V_p$ between $V_{max}$ and $V_{min}$ is very likely of a single-photon response in a high probability. A pulse of a single-photon signal having a peak voltage higher than the effective upper limit voltage $V_{max}$ may actually be of a single photon, but it is highly likely that two photons are simultaneously detected. Therefore, the single-photon property is determined to be false if the peak voltage is equal to or more than the effective upper limit voltage $V_{max}$.

In the same manner, the pulse of a single-photon signal having a peak voltage lower than the effective lower limit voltage $V_{min}$ may actually be a signal of a single photon, but it may be a noise signal such as a dark count pulse that the photodetector of the photoelectric converter has. Therefore, if the peak voltage is equal to or less than the effective lower limit voltage $V_{min}$, the single-photon property is determined to be false.

In this way, it is possible to determine the single-photon property of a single-photon signal by properly setting the effective upper limit voltage and the effective lower limit voltage.

However, when two or more photons are temporally separated and detected by the photoelectric converter 130, the single-photon property cannot be successfully discriminated only by the peak voltage. Other means for the discrimination of the single-photon property are appreciated in addition.

The present invention proposes utilizing the pulse width of a single-photon signal as a complementary method of discriminating the single-photon property.

Specifically, the digital photon-discrimination and timing detector 160 extracts the pulse edges of a digital single-photon signal determined based on at least one preset reference voltage, from the temporal voltage waveform obtained in a predetermined time period of the digital single-photon signal. The pulse width is determined to be the time interval between the temporally earliest pulse edge and the temporally latest pulse edge. If the pulse width is less than or equal to a preset effective upper limit, the single-photon property is discriminated as the state of true or single-photon detection. If the pulse width is more than the effective upper limit, the single-photon property is discriminated to be the state of false or multi-photon detection.

The graph (b) of FIG. 6 illustrates a probability distribution $P_T(T_d)$ showing a pulse width $T_d$ measured with a reference voltage $V_d$ of a certain value as a reference for the single-photon signal of a single-photon response. Herein, the reference voltage $V_d$ is a constant voltage which is set for measuring the pulse width of the single-photon discrimination operation, and preferably has a value equal to or lower than the effective lower limit voltage $V_{min}$.

The measured pulse width $T_d$ fluctuates randomly with a characteristic probability distribution for a single-photon signal. Such a random fluctuation of the pulse width is mainly caused by a random fluctuation of the peak voltage, that is, a random fluctuation of the pulse height.

As shown in the graph (a) of FIG. 6, since the probability of $P_V(V_p)$ of a peak voltage converges to 0 as the peak voltage becomes very high above $V_{max}$, the probability of $P_T(T_d)$ converges to 0 as the pulse width of $T_d$ becomes more than or equal to a certain pulse width. Therefore, the effective upper limit denoted by $T_{d,max}$ exists for the pulse width $T_d$ which can discriminate the single-photon property. If the pulse width $T_d$ is wider than the upper limit $T_{d,max}$, it may indicate that two or more photons are detected with a time difference at a high probability.

For this purpose, the reference-voltage pulse width is measured to be the the time difference between the rising edge and the falling edge of a single-photon signal pulse determined with a preset reference voltage. If it exceeds a preset effective upper limit, the single-photon property is discriminated to be false. Within one measurement period, a single-photon signal may have multiple rising edges and falling edges. The leading rising edge and the trailing falling edge must be selected to find the reference-voltage pulse width.

Figure 7:
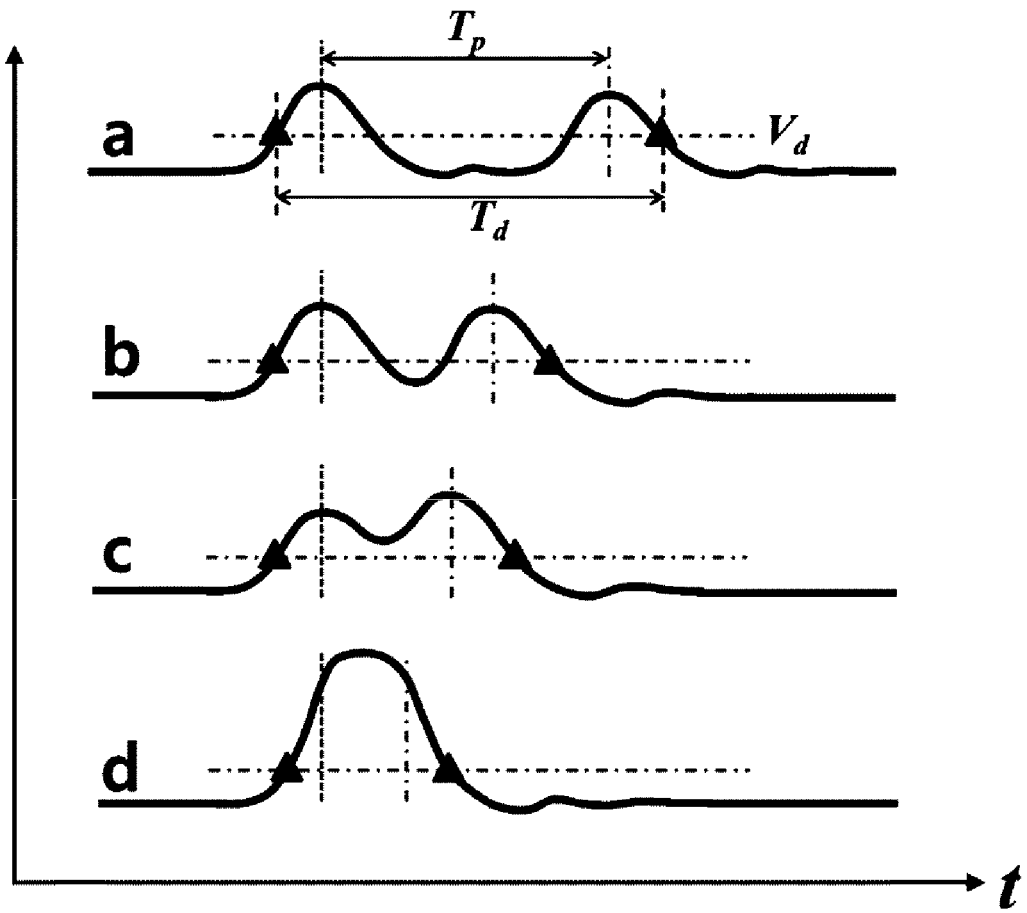
FIG. 7 is a graph exemplarily illustrating the temporal waveforms of single-photon signals in a situation where two photons are detected within one measurement period in the time-resolved single-photon counting apparatus according to an exemplary embodiment of the present invention.

FIG. 7 is a graph exemplarily illustrating the temporal waveforms of single-photon signals in a situation where two photons are detected within one measurement period in the time-resolved single-photon counting apparatus according to an exemplary embodiment of the present invention.

Herein, in each of the signal waveforms a, b, c and d, two single-photon responses are combined with a time interval $T_p$. The time interval $T_p$ becomes narrower from a through d.

In each signal waveform of FIG. 7, a constant reference voltage $V_d$ is illustrated with a horizontal line, which defines the pulse edges of the digital single-photon signal Herein, the reference-voltage pulse width $T_d$ is the time interval from the pulse edge to the last pulse edge. In FIG. 7, the pulse edges are marked with triangle dots.

As illustrated in FIG. 7, when two single-photon responses are combined with a time interval, the reference voltage pulse width $T_d$ appears to be clearly wider than that obtained by a single photon. Therefore, the single-photon property may be determined by the reference-voltage pulse width.

As described above, in the time-resolved single-photon counting apparatus according to an exemplary embodiment of the present invention, the digital photon-discrimination and timing detector 160 may discriminate the single-photon property of a single-photon signal by the peak voltage of a digital single-photon signal, the reference-voltage pulse width or other means. By the peak voltage, the single-photon property may be discriminated to be false for the case that two or more photons are detected simultaneously or nearly simultaneously and the case of dark count pulses. And, by the reference-voltage pulse width, it may be discriminated to be false for the case that two or more photons are detected with a time difference.

In addition, the single-photon property may be discriminated according to the other characteristics: for example, the number of extrema of the signal, temporal derivatives, or temporal integrals.

As another method for the digital photon-discrimination and timing detector 160 to discriminate the single-photon property, it may utilize a limit mask of a single-photon signal. Discrimination of the single-photon property can be performed by finding whether the single-photon signal is outside this limit mask. This method is similar to the limit mask method used in the analysis of signal waveforms in the digital communication.

Meanwhile, a digital single-photon signal is a function of time composed of multiple data points. Therefore, in determining the single-photon property with the limit mask, when the data points exceeding a preset reference number are outside the range of the limit mask, it may be determined as no single-photon property.

Specifically, the digital photon-discrimination and timing detector 160 obtains a rearranged digital single-photon signal as a function of time resetting the digital single-photon signal with the pulse time as the origin, and sets the upper and lower limits of the limit mask as a function of the reset time. Then, by comparing the rearranged digital single-photon signal with the upper and lower limits of the limit mask, if the magnitude of the digital single-photon signal is within the range of the limit mask at more than or equal to a reference number of data points, the single-photon property is determined as the state of true or single-photon detection. In addition, when the magnitude of the digital single-photon signal is less than the lower limit of the limit mask at more than or equal to the reference number of data points, the single-photon property is determined as the state of false or no-photon detection. In addition, when the magnitude of the digital single-photon signal is more than the upper limit of the limit mask at more than or equal to the reference number of data points, the single-photon property is determined as the state of false or multi-photon detection.

Figure 8:
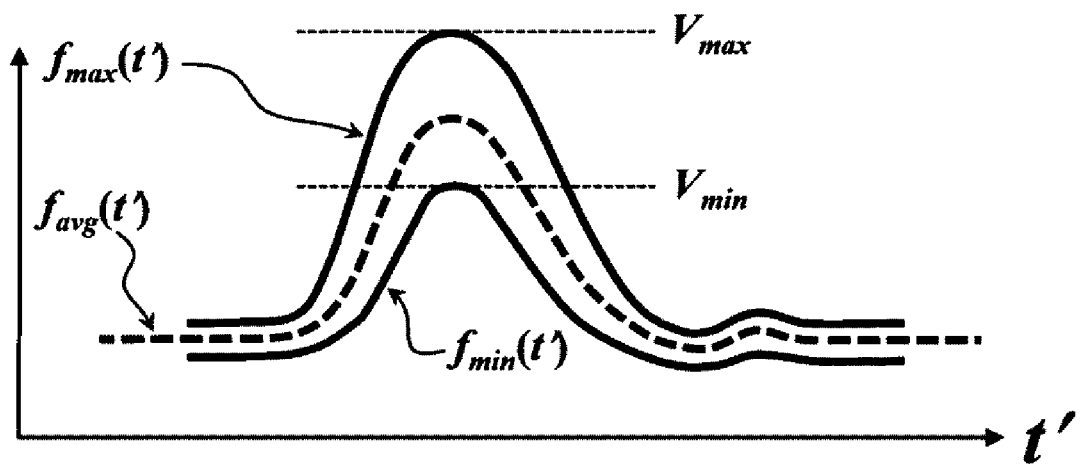
FIG. 8 is a graph exemplarily illustrating the limit mask and temporal signal waveforms for single-photon discrimination in the time-resolved single-photon counting apparatus according to an exemplary embodiment of the present invention.

FIG. 8 is a graph exemplarily illustrating the limit mask and temporal signal waveforms for single-photon discrimination in the time-resolved single-photon counting apparatus according to an exemplary embodiment of the present invention.

Although the single-photon signal and the limit mask function are expressed as continuous functions in FIG. 8, it should be noted that the signals processed by the actual digital photon-discrimination and timing detector are discrete digital data.

A single-photon signal within one measurement period may be expressed as a function $f(t')$ for a new time coordinate $t'$ with the pulse timing of the pulse, that is, a characteristic time point associated with pulse timing, such as a center point, an edge time or a peak time as the origin. As such, the single-photon signal $f(t')$ rearranged to the pulse time point has a random magnitude and pulse width fluctuation due to the intrinsic properties of the photoelectric converter 130 as described above, even if the response is caused by a single photon.

Herein, as illustrated in FIG. 8, the limit mask is a limit value of the signal shape of $f(t')$, and is composed of an upper limit mask $f_{max}(t')$ and a lower limit mask limit $f_{min}(t')$. If the rearranged single-photon signal $f(t')$ is a response by a single photon, it is expected that the magnitude is lower than the upper limit $f_{max}(t')$ and higher than the lower limit $f_{min}(t')$ with high probability at each $t'$ point. Thus, single-photon property is discriminated to be true.

In addition, if the rearranged single-photon signal $f(t')$ deviates from the limit of the limit mask at a time point $t'$, the single-photon property may be determined as false. In this case, if the data of the rearranged digital single-photon signal exceeds the limit of the limit mask at even one point, the single-photon property may be determined to be false, or if the data point exceeds the range of the limit mask at a preset number of data points or more, the single-photon property may be identified as false.

A limit mask upper limit $f_{max}(t')$ and a limit mask lower limit $f_{min}(t')$ may be set based on a single-photon signal $f_{avg}(t')$ derived from an average single photon. The peak voltages of the upper and lower limits of the limit mask may be made to coincide with the effective upper limit voltage $V_{max}$ and the effective lower limit voltage $V_{min}$ of the single-photon signal peak voltage that can be obtained, respectively, as illustrated in FIG. 6.

In the time-resolved single-photon counting apparatus according to an exemplary embodiment of the present invention, the digital photon-discrimination and timing detector 160 may discriminate the single-photon property of a single-photon signal from a preset limit mask as described above. That is, if the rearranged single-photon signal having a certain measurement period is outside the range defined by the limit mask, it is determined that the single-photon property is low.

As pre-processing for the discrimination of the single-photon property by the limit mask, the digital photon-discrimination and timing detector 160 determines the pulse time point of a digital single-photon signal of one input measurement period and rearranges the time axis to obtain a rearranged digital single-photon signal. In this case, the rearrangement operation does not need to be precisely performed, and it may be sufficient even if it is performed at a precision level of a signal sampling time interval $T_s$. Then, the rearranged single-photon signal is compared with a preset limit mask, and when the number of signal data outside the upper and lower limits of the limit mask exceeds a reference number, it is determined that there is no single-photon property.

For the discrimination method using the limit mask, the upper and lower limits of the limit mask may be set by statistically analyzing a single-photon signal by a single photon. Low-intensity light with a guaranteed high probability of the single-photon property is input to the photoelectric converter 130, and the single-photon signal of a single-photon response generated in this way is obtained and rearranged to the pulse time point. For the rearranged single-photon signal, a voltage histogram is obtained for each time point of the rearranged time t'. In this case, the voltage histogram for each time point appears in the same manner as in the graph (a) of FIG. 6. In the same manner as described above, for each time point t', the effective upper limit and effective lower limit voltages suggested by the voltage histogram are obtained and set as the upper limit $f_{max}(t')$ and the lower limit $f_{min}(t')$, respectively.

Single-photon discrimination using the limit mask described above has a higher complexity of digital operation than the discrimination method based on the pulse size and width described above. This is because the digital photon-discrimination and timing detector 160 should undergo the process of measuring the pulse time, rearranging the time and comparing the size of each time point with respect to the input digital single-photon signal. However, the discrimination by the limit mask has an advantage of enabling more precise single-photon discrimination because more characteristics of the waveform of a single-photon signal can be examined than the discrimination method based on the pulse size and width.

Figure 9:
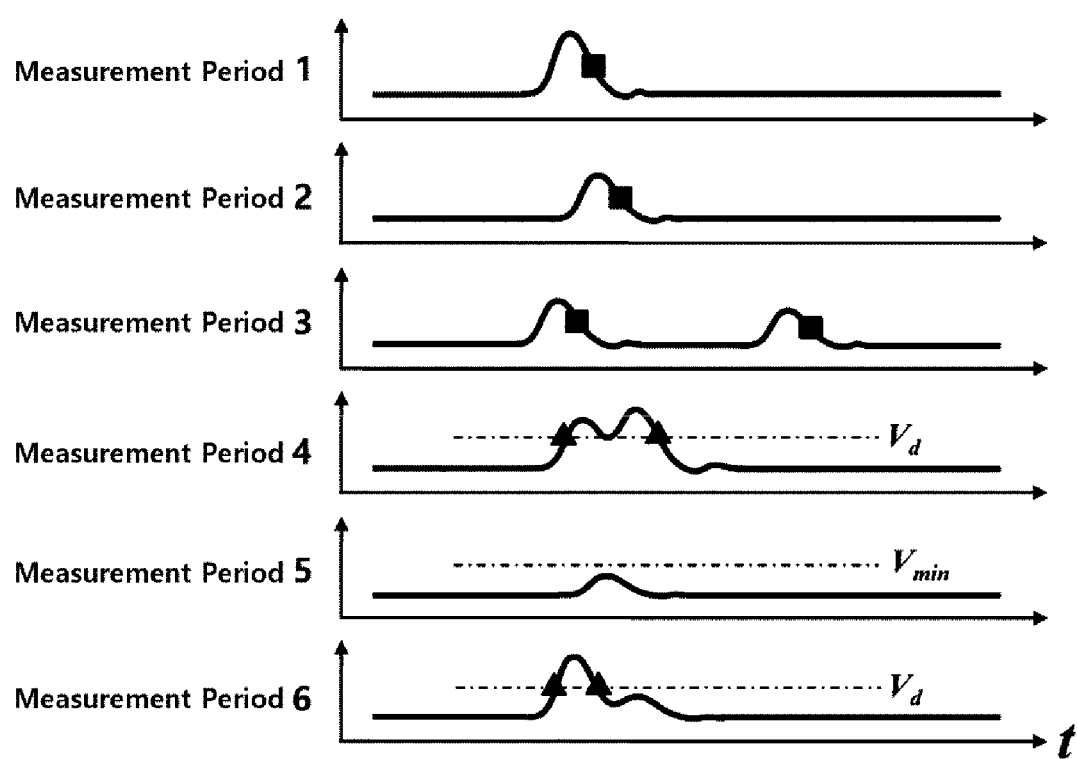
FIG. 9 is a graph exemplarily illustrating the temporal waveforms of single-photon signals for each measurement period when the peak voltage is different for each measurement period and the number of detected photons is different in operating the time-resolved single-photon counting apparatus according to the present invention.

FIG. 9 is a graph exemplarily illustrating the temporal waveforms of single-photon signals for each measurement period when the peak voltage is different for each measurement period and the number of detected photons is different in operating the time-resolved single-photon counting apparatus according to the present invention.

Referring to FIG. 9, the single-photon property is determined to be true in Measurement Period 1 and Measurement Period 2. In addition, the edge time (falling edge) may be determined as the intersection of the reference voltage having a constant rate with respect to the peak voltage. In this case, the signal edge is illustrated as a square dot in FIG. 9.

In Measurement Period 3, the single-photon signal has two split pulses. This can be determined using the fact that the pulse width of the reference voltage $V_d$ is longer than the preset effective upper limit $T_{d,max}$. Again, it is possible to determine that the pulse within a measurement period is due to one or more photons even by the limit mask.

With respect to a single-photon signal in which split pulses are synthesized, such as in Measurement Period 3, the digital photon-discrimination and timing detector 160 according to the present invention simply determines the single-photon property to be false, and accordingly, the information on the measured pulse time point and delay time is ignored such that the time signal processor 170 may not count.

As another method, if the reference voltage pulse width is longer than the preset effective lower limit $T_{d,min}$, considering that these two pulses are spaced apart by a wide time interval so as not to interfere with each other, the digital single-photon signal of one measurement period is temporally divided such that each individual pulse signal is included, and the divided digital single-photon signal is treated as one digital single-photon signal, and the single-photon property is determined again, respectively. In addition, if the single-photon property is determined to be true, accordingly, the time signal processor 170 may perform the counting operation by considering the information of the pulse time point and the delay time measured together as valid.

In Measurement Period 4, the single-photon signal appears as two single-photon signal pulses that are superimposed.

As described above, this may be determined by the fact that the pulse width of the reference voltage $V_d$ is longer than the preset effective upper limit $T_{d,max}$. Again, it may be determined that there is no single-photon property even through the limit mask.

In Measurement Period 5, the pulse of the single-photon signal has a low peak voltage. As described above, the single-photon property may be determined as false through the fact that the peak voltage of the pulse is lower than the preset effective lower limit voltage $V_{min}$. In this case, the obtained single-photon signal may be a noise signal of the photoelectric converter 130 such as a dark count pulse.

Meanwhile, in Measurement Period 6, the single-photon signal has two peaks, but the pulse width of the reference voltage $V_d$ is narrower than the preset effective upper limit $T_{d,max}$. In the method of determining the single-photon property by the magnitude and width of a pulse, the single-photon property of such a pulse may be determined as true. However, in the discrimination method using the limit mask, the single-photon property may be determined to be false by the change of the pulse shape. Such a pulse shape may be a result of chance due to the stochastic variation of a single-photon response, or may be a result of a single-photon pulse response and noise such as a dark count appearing almost simultaneously. The discrimination method by the limit mask is more conservative and discriminates these pulses as no single-photon property.

Meanwhile, the time-resolved single-photon counting apparatus according to an exemplary embodiment of the present invention may store data of digital single-photon signals and information on pulse time points and the single-photon property discrimination measured for each measurement period in a digital storage device. In addition, the operator of the time-resolved spectroscopy apparatus may review the stored data to determine whether the digital photon-discrimination and timing detector 160 is operating correctly. This review allows the operator to check whether the parameters of the set pulse timing and single-photon discrimination are valid. The operator may reset the parameters of the pulse time-point measurement and single-photon property discrimination based on the review result to re-operate the digital photon-discrimination and timing detector 160 and the time signal processor 170 later with the stored digital single-photon signals.

As described above, the time-resolved single-photon counting apparatus according to an exemplary embodiment of the present invention may monitor a detailed operational situation and reset the measurement process due to the inherent advantage of digital technology. In this way, it is possible to more closely optimize the operation of the time-resolved single-photon counting apparatus and provide high reliability in the measurement results. These characteristics cannot be expected in the conventional technology based on analog technology.

In the time-resolved single-photon counting apparatus of the present invention presented above, it has been described that the single-photon response of the photoelectric converter 130 appears to be a bell shape or a Gaussian function and that the waveform thereof has either a positive peak or a negative peak.

When the photoelectric converter 130 outputs a bell-shaped pulse for a single-photon pulse as described above, the following disadvantages exist.

In order to determine the edge time of a single-photon signal, the digital photon-discrimination and timing detector 160 must first find the peak voltage of the signal. Even when the pulse time point is determined by another method, the accurate pulse time point may be determined only when the signal is densely sampled in the vicinity of the peak by the AD signal converter 150. In addition, complex signal processing such as signal interpolation and curve fitting may be required to ensure the accuracy of the mathematical operation for measuring the pulse time point.

In the practical implementation and operation of the present invention, the AD signal converter 150 has a limited dynamic range. That is, a ratio of the maximum voltage range to the quantized voltage step is finite. If the signal voltage exceeds the range, the AD signal cannot be accurately converted. In order to minimize the quantization noise, it is preferred to fully utilize the voltage range making the AD signal converter 150 often vulnerable to the signal's over-ranging at the peak. As a measure of avoiding the complexity of the pulse time-point calculation and the risk involved with the limited dynamic range described above, the time-resolved single-photon counting apparatus according to an exemplary embodiment of the present invention may additionally include a pulse-shape converter 140. Then, the pulse-shape converter 140 converts the temporal shape of a single-photon signal fed by the photoelectric converter 130 into a preset pulse shape and outputs a shape-converted single-photon signal to the AD signal converter 150.

Herein, as a preferred embodiment of the present invention, the shape-converted single-photon signal which is output by the pulse-shape converter 140 may have signal components of direct current (DC) and alternating current (AC), and may have a characteristic of the temporal shape that the signal's voltage linearly increases or decreases crossing the voltage of the DC component in the central region of the pulse for the shape-converted single-photon signal.

Figure 10:
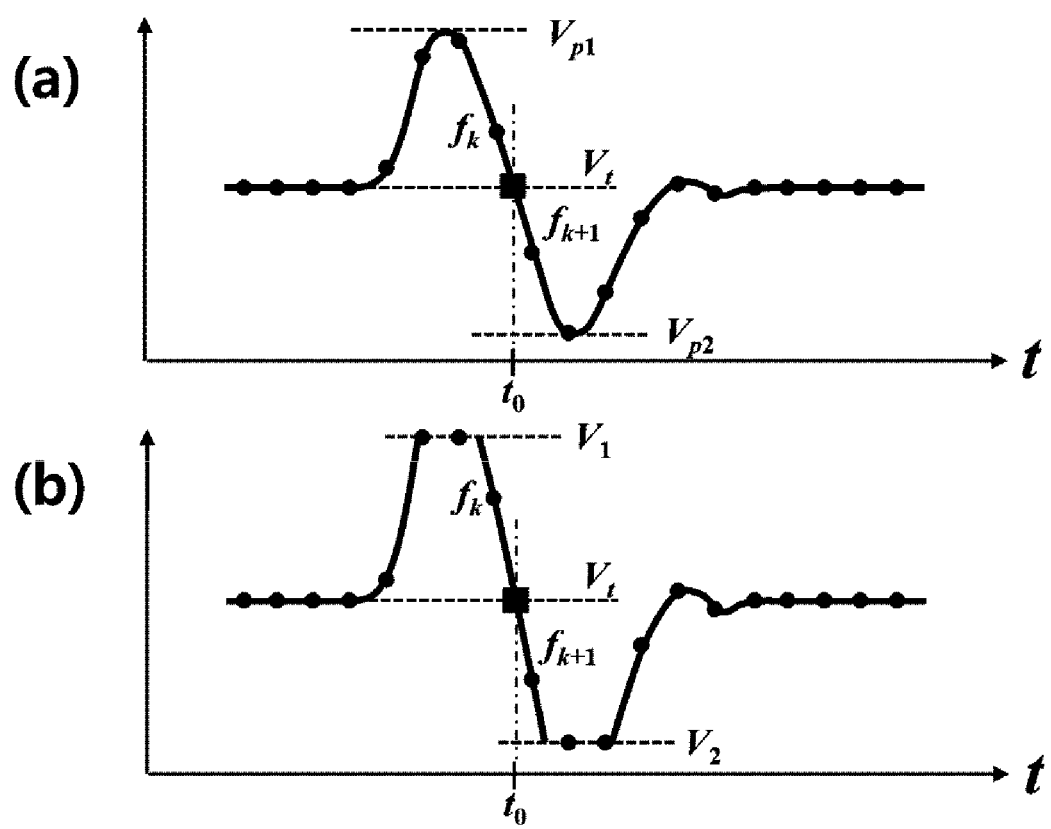
FIG. 10 is a graph exemplarily illustrating the temporal waveforms of shape-converted single-photon signals which are output signals of a pulse-shape converter in the time-resolved single-photon counting apparatus according to an exemplary embodiment of the present invention.

FIG. 10 is a graph exemplarily illustrating the temporal waveforms of shape-converted single-photon signals which are output signals of a pulse-shape converter in the time-resolved single-photon counting apparatus according to an exemplary embodiment of the present invention. (a) is the case when the shape-converted single-photon signal is fully sampled by the AD signal converter 150 with no over-ranging, while (b) is the case when the amplitude of the shape-converted single-photon signal partially exceeds the voltage range of the AD signal converter 150. In (b), the digital single-photon signals are clipped in the vicinity of the peaks.

In FIG. 10, the solid lines represents analog waveforms of the shape-converted single-photon signals, and the circular dots represent the discretely sampled data that the AD signal converter gets.

As illustrated in FIG. 10, in a preferred exemplary embodiment of the present invention, the shape-converted single-photon signal is an antisymmetric pulse having positive and negative peaks, and the voltage of the signal intersects the DC-component voltage in the temporally central region of the pulse. In addition, the voltage change of the signal has a linear characteristic in the central region of the pulse.

For such a shape-converted single-photon signal, the characteristic pulse time point may be measured more simply and reliably than a bell-shaped single-photon signal. To this end, the digital photon-discrimination and timing detector 160 first measures the DC-component voltage of the shape-converted single-photon signal. This may be obtained simply by averaging the signal voltages out of the effective duration of the pulses. In addition, by using the DC voltage measured in this way as the reference voltage $V_t$, the central edge of the pulse may be detected, which is the crossing point of the signal's voltage at $V_t$.

The precise time point of the shape-converted single-photon signal central edge may also be determined by a simple first-order equation due to the linearly varying characteristics. If the digital single-photon signal acquired at the signal sampling time $t_k$ just before the signal passes the reference voltage $V_t$ is $f_k$, and the signal acquired at $t_{k+1}$ is $f_{k+1}$, the slope of the linear voltage change, that is, the voltage change rate s is calculated by Mathematical Formula 1 given below.

$$s=(f_{k+1}-f_k)/(t_{k+1}-t_k) \quad \text{[Mathematical Formula 1]}$$

The signal voltage f(t) at a certain time point t located between the two signal points is calculated by Mathematical Formula 2 given below.

$$f(t)=f_k+s(t-t_k) \quad \text{[Mathematical Formula 2]}$$

Accordingly, the time $t_0$ at which the signal voltage passes through the reference voltage $V_t$ is calculated by Mathematical Formula 3 given below.

$$t_0=t_k+(V_t-f_k)/s \quad \text{[Mathematical Formula 3]}$$

In this way, the shape-converted single-photon signal may simply determine the time point of the central edge from the linearly changing section. In addition, if only the signal data, $f_k$ and $f_{k+1}$, of both sides adjacent to the central edge are obtained, errors of the other signal data make no problem. Accordingly, even with the clipped pulse illustrated in (b) of FIG. 10, the time point of the central edge can be accurately determined.

The pulse-shape converter 140 is a type of electrical signal filters specially designed to have the desired temporal shape for the impulse response. Such a filter may be implemented in the same way as a conventional filter of electrical signals is implemented.

Figure 11:
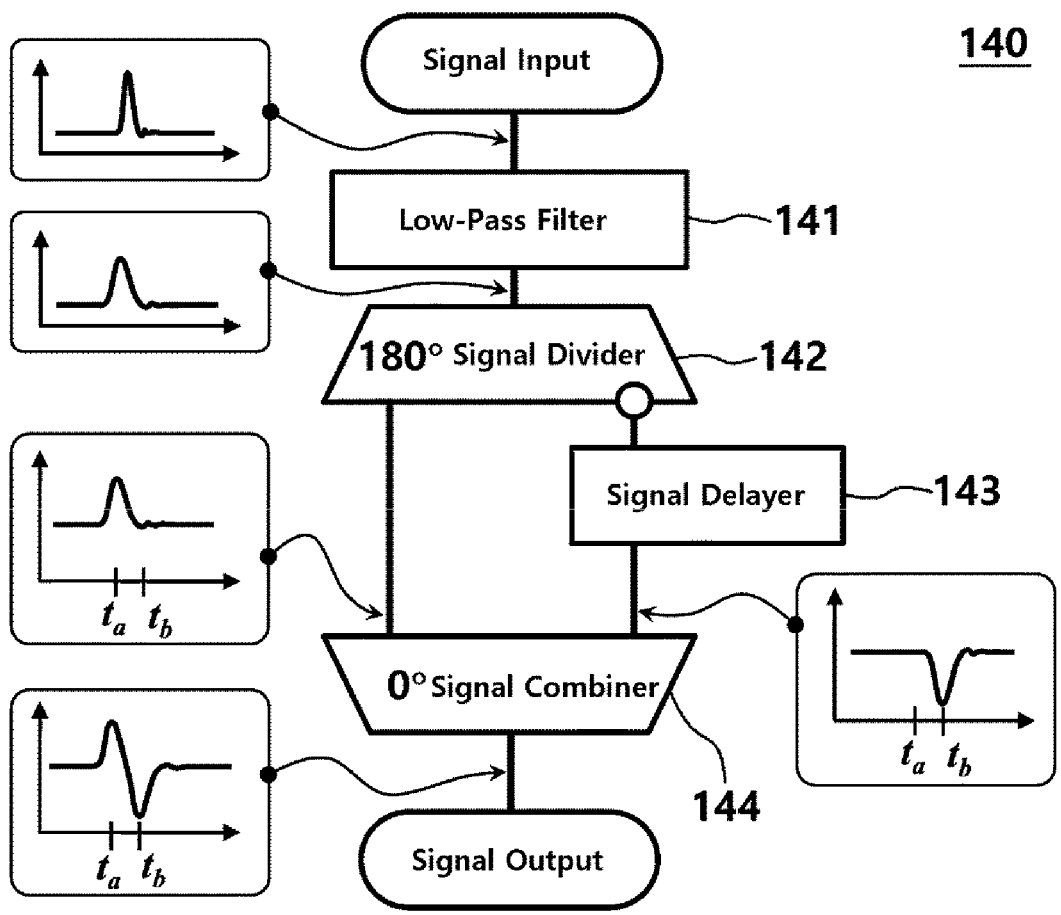
FIG. 11 is a detailed block diagram of the pulse-shape converter in the time-resolved single-photon counting apparatus according to an exemplary embodiment of the present invention.

FIG. 11 is a detailed block diagram of the pulse-shape converter in the time-resolved single-photon counting apparatus according to an exemplary embodiment of the present invention.

Referring to FIG. 11, the pulse-shape converter 140 is configured to split a single-photon signal and recombine the same again with a signal delay. It consists of a signal divider 142 for dividing the input single-photon signal into two, a signal delayer 143 for delaying anyone of the divided signals, and a signal combiner 144 for combining the two signals again.

The signal delayer 143 is sufficient with a simple cable delay. Either one of the ports of the signal divider 142 or the signal combiner 144 inverts the signal's polarity by changing the signal phase by 180 degrees. For example, as shown in FIG. 11, the signal phase of the right output port of the signal divider 142 may be changed by 180 degrees such that the polarity of the signal may be switched.

The pulse-shape converter 140 having this structure may include a low-pass filter 141 for widening the pulse width of an input signal. This low-pass filter may be added before the signal divider 142 or after the signal combiner 143. In a preferred exemplary embodiment, the low-pass filter 141 has an impulse response close to a symmetrical bell shape, and may be a high-order Gaussian filter or a high-order Bessel filter.

In the pulse-shape converter 140, the signal delay of the signal delayer 143 and the bandwidth of the low-pass filter 141 is set to obtain a desired pulse shape. A desired pulse shape may be obtained as illustrated in FIG. 10, when the full width at half maximum (FWHM) of the pulse width at the output of the low-pass filter 141 matches the signal delay.

Meanwhile, discrimination operation of the single-photon property for the shape-converted single-photon signal may also be performed based on the pulse characteristics or using a limit mask.

As illustrated in FIG. 10, the single-photon property discrimination based on the pulse height of the shape-converted single-photon signal may be performed as described above by measuring the positive or negative peak voltage of the pulse, $V_{p1}$ and $V_{p2}$. However, when the signal is clipped as in (b) of FIG. 10, waveform information near the peak is lost and the peak voltage cannot be determined.

As an alternative method, the peak voltage of the pulse may be estimated indirectly by the voltage slope s found at the central edge. If the magnitude of the slope s is outside the range of the preset effective lower limit and effective upper limit, it is determined that the single-photon property is false.

Meanwhile, the single-photon property discrimination by the pulse width of the shape-converted single-photon signal as illustrated in FIG. 10 may be made by the reference-voltage pulse width defined by the time interval between the start edge and the end edge measured at reference voltages. In this case, by setting multiple reference voltages for pulse edges, the start edge and end edge can be found by the most prior edge and the latest edge, respectively, where the shape-converted single-photon signal crosses any of the reference voltages.

Meanwhile, as described above, it is also possible to discriminate the single-photon property by setting a limit mask for the shape-converted single-photon signal. Specifically, the edge time is first measured from the digital single-photon signal, and the rearranged digital single-photon signal is obtained therefrom, and the single-photon property may be determined by comparing the same with the preset upper and lower limits of the limit mask.

Figure 12:
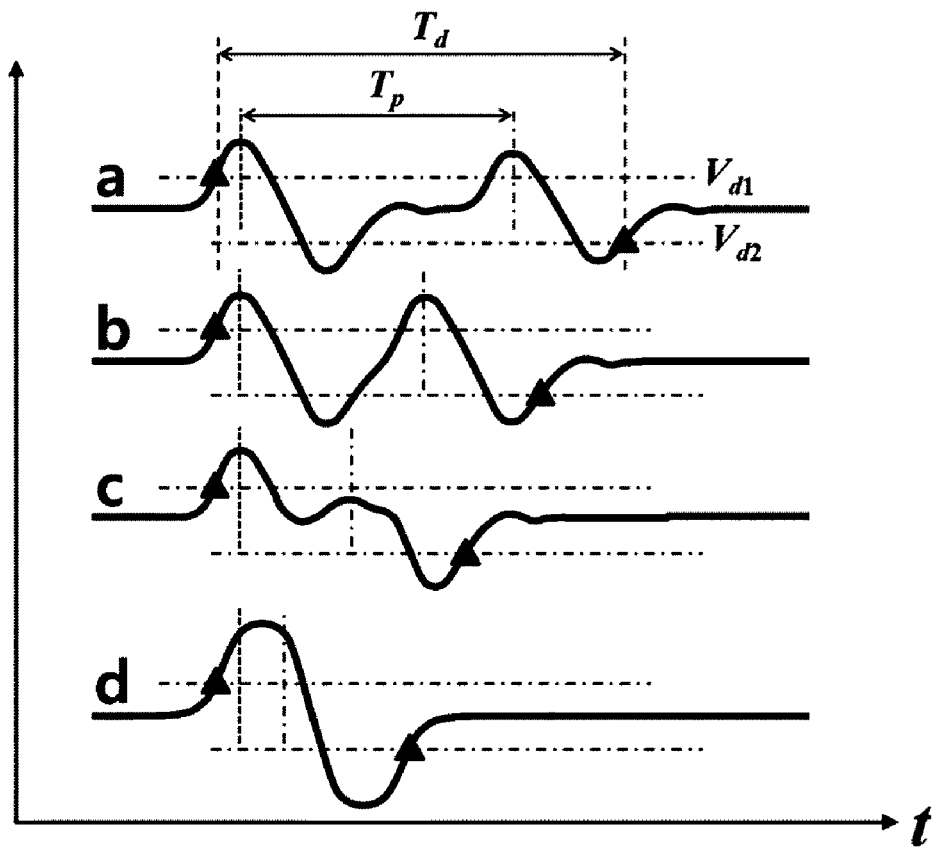
FIG. 12 is a graph exemplarily illustrating the temporal waveforms of shape-converted single-photon signals in a situation where two photons are detected within a measurement period when the time-resolved single-photon counting apparatus according to an exemplary embodiment of the present invention includes a pulse-shape converter.

FIG. 12 is a graph exemplarily illustrating the temporal waveforms of shape-converted single-photon signals in a situation where two photons are detected within a measurement period when the time-resolved single-photon counting apparatus according to an exemplary embodiment of the present invention includes a pulse-shape converter.

Referring to FIG. 12, in each signal waveform a, b, c, and d, two single-photon response pulses are combined at a time interval $T_p$. The time interval $T_p$ becomes narrower as it goes from a to d.

In each signal waveform, constant reference voltages, $V_{d1}$ and $V_{d2}$, are illustrated with the horizontal lines. Herein, the reference-voltage pulse width $T_d$ is defined as the time interval between the pulse edge at which the signal first passes through $V_{d1}$ or $V_{d2}$ and the last pulse edge passing through $V_{d1}$ or $V_{d2}$. In FIG. 12, the pulse edges are indicated by triangle dots. As illustrated in FIG. 12, in the case where two single-photon responses are combined with a considerable time interval, the reference-voltage pulse width $T_d$ is clearly wider. Therefore, the single-photon property may be discriminated by the reference-voltage pulse width.

Figure 13:
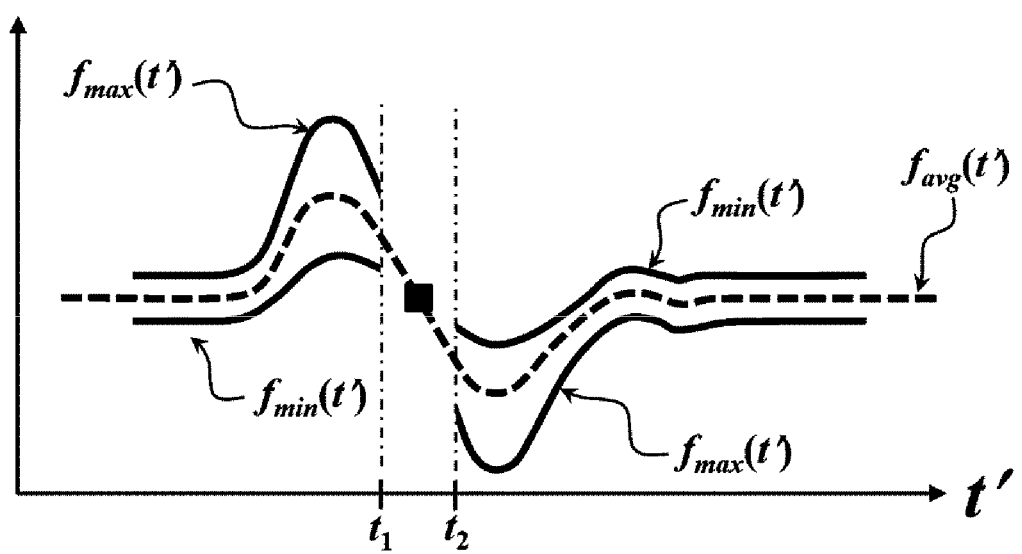
FIG. 13 is a graph exemplarily illustrating the limit mask and temporal signal waveforms for the single-photon property discrimination when a pulse-shape converter is included in the time-resolved single-photon counting apparatus according to an exemplary embodiment of the present invention.

FIG. 13 is a graph exemplarily illustrating the limit mask and temporal signal waveforms for the single-photon property discrimination when a pulse-shape converter is included in the time-resolved single-photon counting apparatus according to an exemplary embodiment of the present invention.

Although the single-photon signal and the limit mask function are expressed as continuous functions in FIG. 13, it should be noted that the signals processed by the actual digital photon-discrimination and timing detector are discrete digital data.

As described above, the digital photon-discrimination and timing detector 160 may use a limit mask as a method for discriminating the single-photon property from a digital single-photon signal. A pulse time point is first detected for the input digital single-photon signal. A time point of the above-described central edge may be used for the pulse time point. The digital single-photon signal is rearranged with respect to the rearranged time t' for the pulse time point to be the origin point. In this case, it is sufficient that the rearrangement operation is performed at a precision level of the signal sampling time interval $T_s$.

For the rearranged digital single-photon signal, as shown in FIG. 13, the upper limit $f_{max(t')}$ and the lower limit $f_{min(t')}$ of the limit mask are set around the average digital single-photon signal $f_{avg(t')}$. If the signal voltage of the rearranged digital single-photon signal is outside the range defined by the limit mask, it is determined that there is no single-photon property.

Herein, the upper and lower limits of the limit mask are not continuous functions and may be set to have an empty region between $t_1$ and $t_2$ with respect to the central region of the pulse, that is, the time point $t'=0$ of the central edge. This is to avoid the problem that the functions of the upper and lower limits of the limit mask intersect each other near the central edge.

Meanwhile, if the digital single-photon signal is clipped out of the dynamic range of the AD signal converter 150, it may be clipped to the same limit as the upper and lower limits of the limit mask and used for photon discrimination. Alternatively, it is possible to ignore the clipped signal data and perform the photon discrimination by the limit mask only with the unclipped signal data.

In the time-resolved single-photon counting apparatus according to an exemplary embodiment of the present invention, as described above, the digital photon-discrimination and timing detector 160 determines the single-photon property, and the time signal processor 170 refers to the above when constructing the time-resolved single-photon counting information.

As a simple reference method, the time signal processor 170 may construct the time-resolved single-photon counting information only with the delay time of the measurement period in which the single-photon property is determined to be true.

According to this operation, unlike the conventional time-resolved single-photon counting apparatus, it is possible to exclude errors in pulse time-point measurement caused by multi-photon detection events even if the frequency is considerably high. Due to this advantage, the time-resolved single-photon counting apparatus according to an exemplary embodiment of the present invention may process an optical signal having a higher intensity than the conventional one, and thus, the overall measurement speed may be increased.

Meanwhile, in the description of the digital photon-discrimination and timing detector 160 described above, while it has been described that the single-photon property is discriminated in two stages of true and false, the time-resolved single-photon counting apparatus according to an exemplary embodiment of the present invention includes a digital photon-discrimination and timing detector 160 which discriminates the single-photon property into more subdivided stages.

For example, it is possible for the digital photon-discrimination and timing detector 160 to discriminate the single-photon property in three stages of no-photon detection, single-photon detection or multi-photon detection for each measurement period signal based on the pulse characteristic information obtained from the digital single-photon signal. Herein, no-photon detection and multi-photon detection subdivide the previously false single-photon cases.

In the above-described single-photon property discrimination method based on the pulse size and pulse width, when the magnitude of the peak voltage of a digital single-photon signal is smaller than a preset effective lower limit, it may be determined as no-photon. In addition, when the magnitude of the peak voltage of a single-photon signal is greater than a preset effective upper limit, it may be determined as multi-photon.

In addition, even if the magnitude of the peak voltage is lower than the preset effective upper limit, when the pulse width of the reference voltage is more than the upper limit, it may be determined as multi-photon.

In the photon discrimination method by the limit mask, when the voltage level of a rearranged digital single-photon signal is smaller than the magnitude of the lower limit of the limit mask, it may be determined as no-photon. In addition, when the voltage level of a single-photon signal is greater than the magnitude of the upper limit of the limit mask, it may be determined as multi-photon.

In the description of the above photon discrimination method, the magnitude is the magnitude of the absolute value of the signal voltage measured based on the DC component voltage of a single-photon signal as the measurement of the signal amplitude ignoring the polarity of the signal.

The relative frequencies of the above three exclusive cases, that is, no-photon detection, single-photon detection and multi-photon detection, are related to the optical intensity of an optical signal detected by the photoelectric converter 130. At very low intensities, the ratio of no-photon is overwhelmingly high. As the intensity increases, the ratio of single photons increases and the proportion of no-photon decreases accordingly. When the intensity becomes very large, the ratios of single photon and no-photon decrease and the ratio of multi-photons increases. This probability distribution of the number of detected photons is known to follow the Poisson distribution.

In the conventional time-resolved single-photon counting apparatus, it operates as if only no-photon detection is determined for the single-photon property. That is, it did not distinguish between single-photon detection and multi-photon detection. Accordingly, the frequency of multi-photon detection was suppressed only with a method of maintaining the intensity of the optical signal to be low depending on the stochastic characteristics. Therefore, as described above, the single-photon detection rate had to be operated at 0.01 or less. In the time-resolved single-photon counting apparatus according to an exemplary embodiment of the present invention, even when the single-photon detection rate is 0.1 or more, the multi-photon signal may be excluded from the counting. Thus, the single-photon detection rate is improved by a factor of 10 times or more.

Meanwhile, in the time-resolved single-photon counting apparatus according to an exemplary embodiment of the present invention, if the excitation light source 110 or the specimen optics 120 includes a means for adjusting the intensity of the pulsed excitation light or optical signal, the discrimination signal may be utilized to find the optimal operating conditions by automating. In particular, if the excitation light source 10 can adjust the intensity of its light output, the single-photon detection rate may be maximized, and pulsed excitation light of unnecessarily high intensity may not be irradiated.

To this end, the time signal processor 170 measures the ratio of the measurement periods indicated by no-photon detection, single-photon detection and multi-photon detection, that is, a no-photon rate, single-photon rate and multi-photon rate from the photon-discrimination signal which is input for each measurement period. Providing such a multi-photon rate, single-photon rate or no-photon rate to the operator allows the operator to optimize the single-photon rate by manually adjusting the intensity of the pulsed excitation light or spectral signal.

In addition, for the automated optimization of the single-photon rate, the excitation light source 110 or the specimen optics 120 may perform a closed-loop control in which when the no-photon rate is below a certain level, the intensity of the pulsed excitation light or spectral signal is increased, or when the multi-photon rate or single-photon rate is above a certain level, the intensity of the pulsed excitation light or optical signal is decreased. This automation allows for optimized and reliable time-resolved single-photon counting information without any operator intervention.

Meanwhile, the exemplary embodiments of the present invention disclosed in the present specification and drawings are only presented as specific examples to easily explain the technical contents of the present invention and help the understanding of the present invention, and are not intended to limit the scope of the present invention. That is, it will be apparent to those of ordinary skill in the art to which the present invention pertains that other modification examples can be implemented based on the technical spirit of the present invention.

What is claimed is:

1. A time-resolved single-photon counting apparatus, comprising:

an excitation light source for generating pulsed excitation light;

a specimen optics for collecting an optical signal produced by irradiating the pulsed excitation light to a specimen;

a photoelectric converter for photoelectrically converting the optical signal to generate an analog single-photon signal;

an analog-to-digital (AD) signal converter for sampling the analog single-photon signal to convert the same into a digital single-photon signal;

a digital photon-discrimination and timing detector for generating a photon-discrimination signal by discriminating the single-photon property of the digital single-photon signal and generating a delay time signal having delay time information by measuring a pulse time point of the digital single-photon signal; and a time-signal processor for counting valid single-photon detection events according to the delay time with reference to the photon-discrimination signal, wherein the digital photon-discrimination and timing detector generates a photon-discrimination signal obtained by discriminating the single-photon property for the digital single-photon signal based on the characteristics of a temporal voltage waveform provided by the digital single-photon signal, wherein the delay time information is relative time information of a pulse time point of the digital single-photon signal with respect to a pulse generation time point of the pulsed excitation light, and wherein the time-signal processor discriminates as the valid single-photon detection event when the photon-discrimination information is in the state of a true single-photon property or single-photon detection.

2. The time-resolved single-photon counting apparatus of claim 1, further comprising:

a system clock for generating and dividing a measurement clock signal having synchronization timing information for the pulse generation of the pulsed excitation light, and a sample clock signal having synchronization timing information of a signal sampling operation of the analog-to digital signal converter, wherein the measurement clock signal and the sample clock signal are both periodic timing signals having a periodic ratio of a constant integer, and temporal correlation with each other.

3. The time-resolved single-photon counting apparatus of claim 2, wherein the measurement clock signal is generated by photoelectric conversion of the pulsed excitation light generated by the excitation light source, and wherein the system clock generates the sample clock signal having a periodic ratio of a constant integer with the measurement clock signal.

4. The time-resolved single-photon counting apparatus of claim 1, wherein the digital photon-discrimination and timing detector discriminates the single-photon property by extracting the characteristics of the temporal voltage waveform including at least one of a pulse size, a pulse width and a pulse shape provided by the digital single-photon signal.

5. The time-resolved single-photon counting apparatus of claim 4, wherein the digital photon-discrimination and timing detector extracts a pulse peak of the digital single-photon signal, discriminates the single-photon property as the state of true or single-photon detection if the pulse peak is within the range of a preset effective upper limit voltage and effective lower limit voltage, discriminates the single-photon property as the state of false or no-photon detection when the pulse peak is less than the effective lower limit voltage, and discriminates the single-photon property as the state of false or multi-photon detection if the pulse peak is more than the effective upper limit voltage.

6. The time-resolved single-photon counting apparatus of claim 4, wherein the digital photon-discrimination and timing detector extracts a pulse edge of the digital single-photon signal determined based on at least one preset reference voltage, from the temporal voltage waveform obtained in a predetermined time period of the digital single-photon signal, measures a pulse width at the time interval between the temporally earliest pulse edge and the temporally latest pulse edge, discriminates the single-photon property as the state of true or single-photon detection if the pulse width is less than or equal to a preset effective upper limit pulse width, and discriminates the single-photon property as the state of false or multi-photon detection if the pulse width is more than the effective upper limit pulse width.

7. The time-resolved single-photon counting apparatus of claim 1, wherein the digital photon-discrimination and timing detector extracts the characteristics of a temporal voltage waveform including at least one of a pulse size, a pulse edge and a pulse shape provided by the digital single-photon signal, and counts a pulse time point as a relative time point at which the optical signal is detected by the photoelectric converter from the characteristics of the temporal voltage waveform.

8. The time-resolved single-photon counting apparatus of claim 7, wherein the digital photon-discrimination and timing detector extracts a pulse peak of the digital single-photon signal, and finds a rising or falling pulse edge of the digital single-photon signal based on a constant-rate voltage value obtained by multiplying the voltage of the pulse peak by a preset constant rate to extract the time point of the rising or falling pulse edge to take as the pulse time point.

9. The time-resolved single-photon counting apparatus of claim 8, wherein the digital photon-discrimination and timing detector extracts a voltage of the pulse peak or edge time point by interpolating or curve fitting the data of the digital single-photon signal temporally adjacent to the pulse peak or pulse edge.

10. The time-resolved single-photon counting apparatus of claim 7, wherein the digital photon-discrimination and timing detector calculates a time average value or a central time point of a pulse obtained from a time sum using the voltage waveform of the digital single-photon signal as a weight value, and takes the central time point as the pulse time point.

11. The time-resolved single-photon counting apparatus of claim 1, wherein the digital photon-discrimination and timing detector obtains a rearranged digital single-photon signal as a function of the time at which the digital single-photon signal is reset with the pulse time point as the origin point, sets upper and lower limits of a limit mask as a function of the reset time to compare the rearranged digital single-photon signal with the upper and lower limits of the limit mask, discriminates the single-photon property as the state of true or single-photon detection if the magnitude of the digital single-photon signal is within the range of the limit mask at a reference number or more of data points, discriminates the single-photon property as the state of false or no-photon detection if the magnitude of the digital single-photon signal is less than the lower limit of the limit mask at a reference number or more of data points, and discriminates the single-photon property as the state of false or multi-photon detection if the magnitude of the digital single-photon signal is more than the upper limit of the limit mask at a reference number or more of data points.

12. The time-resolved single-photon counting apparatus of claim 1, further comprising a pulse-shape converter for converting the single-photon signal which is output from the photoelectric converter into a preset temporal pulse shape to output to the analog-to-digital signal converter, wherein the signal voltage of the shape-converted single-photon signal has a central region of a pulse passing across the voltage value of a DC component thereof, and has a temporal pulse shape in which the signal voltage linearly increases or decreases at a constant voltage change rate in the central region.

13. The time-resolved single-photon counting apparatus of claim 12, wherein the pulse-shape converter consists of a signal divider for dividing the single-photon signal into two, a signal delayer for delaying anyone of the divided signals, and a signal combiner for combining these two signals, and wherein any one of the signal divider and the signal combiner is configured to invert a signal polarity for one of the divided or combined signals by altering the signal phase by 180 degrees.

14. The time-resolved single-photon counting apparatus of claim 12, wherein the digital photon-discrimination and timing detector measures a DC component voltage from the digital single-photon signal derived from the shape-converted single-photon signal, finds a central edge that is a pulse edge determined based on the DC component voltage in the central region of the digital single-photon signal, and takes the central edge time point as the pulse time point.

15. The time-resolved single-photon counting apparatus of claim 1, wherein the excitation light source or the specimen optics has an adjusting means capable of adjusting the optical intensity of the pulsed excitation light or the optical signal, wherein the time-signal processor measures a single-photon rate as the frequency of a photon-discrimination signal that appears in the state of single-photon detection for a predetermined period of time, or measures a no-photon or multi-photon rate as the frequency of a photon-discrimination signal that appears in the state of no-photon detection or multi-photon detection for a predetermined period of time, and wherein the adjusting means adjusts the optical intensity of the optical signal such that the single-photon rate, no-photon rate or multi-photon rate is within a preset range.

* * * * *